United States Patent
Bae et al.

(10) Patent No.: US 12,265,835 B2
(45) Date of Patent: Apr. 1, 2025

(54) METHOD FOR PRELOADING APPLICATION AND ELECTRONIC DEVICE SUPPORTING SAME

(71) Applicant: Samsung Electronics Co., Ltd., Suwon-si (KR)

(72) Inventors: Jinshik Bae, Suwon-si (KR); Kwanjin Jung, Suwon-si (KR); Hyunchul Seok, Suwon-si (KR); Daehyun Cho, Suwon-si (KR); Hanju Bae, Suwon-si (KR); Mooyoung Kim, Suwon-si (KR); Minjung Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/322,919

(22) Filed: May 24, 2023

(65) Prior Publication Data

US 2023/0325214 A1    Oct. 12, 2023

Related U.S. Application Data

(63) Continuation of application No. PCT/KR2021/002952, filed on Mar. 10, 2021.

(30) Foreign Application Priority Data

Dec. 2, 2020  (KR) .................. 10-2020-0166886
Jan. 29, 2021  (KR) .................. 10-2021-0013393

(51) Int. Cl.
*G06F 9/451* (2018.01)
*G06F 1/16* (2006.01)

(52) U.S. Cl.
CPC ............ *G06F 9/451* (2018.02); *G06F 1/1616* (2013.01); *G06F 1/1652* (2013.01)

(58) Field of Classification Search
CPC ...... G06F 9/451; G06F 1/1616; G06F 1/1652; G06F 2203/04803; G06F 1/1624;
(Continued)

(56) References Cited

U.S. PATENT DOCUMENTS 7,895,261 B2 * 2/2011 Jones .................... H04L 67/289
                                                        711/158
9,262,059 B2   2/2016 Kim et al.
(Continued)

FOREIGN PATENT DOCUMENTS

JP        5661311 B2    1/2015
KR    20140080174 A    6/2014
(Continued)

OTHER PUBLICATIONS

Pei Cao, Opportunities and Challenges for Caching and Prefetching on Mobile Devices, Nov. 1, 2015, IEEE Workshop on Hot Topics in Web Systems and Technologies, pp. 49-53 (Year: 2015).*
(Continued)

*Primary Examiner* — Tam T Tran
(74) *Attorney, Agent, or Firm* — Nixon & Vanderhye P.C.

(57) ABSTRACT

An electronic device may include: a housing including a first housing and a second housing movable with respect to the first housing; a flexible display in which a display area for displaying a screen is expanded or reduced as the second housing moves with respect to the first housing; a memory; and a processor, wherein the processor is configured to: identify a change in the size of the display area on the basis of the movement of the second housing relative to the first housing; determine an application to be preloaded from among a plurality of applications on the basis of the identified size of the display area; load, into the memory, a preload process including some of resources for executing the determined application to be preloaded; and, in response (Continued)

to the occurrence of an event associated with the execution of the application to be preloaded, load an activity for the execution of the application by using the loaded preload process.

16 Claims, 20 Drawing Sheets

(58) Field of Classification Search
CPC .. G06F 1/1677; G06F 3/0481; G06F 3/04886; G06F 9/445; G06F 9/44578; G09G 5/22
See application file for complete search history.

(56) References Cited

U.S. PATENT DOCUMENTS

| | | | |
|---|---|---|---|
| 9,354,804 B2 | 5/2016 | Berkes et al. | |
| 9,508,040 B2* | 11/2016 | Bilal | G06N 5/02 |
| 10,582,001 B2* | 3/2020 | Straub | H04W 12/37 |
| 10,860,201 B2 | 12/2020 | Kang et al. | |
| 10,936,340 B2 | 3/2021 | Lee et al. | |
| 10,977,771 B2* | 4/2021 | Jeong | G06F 3/0487 |
| 11,042,192 B2* | 6/2021 | Choi | G06F 9/4843 |
| 11,483,415 B2* | 10/2022 | Yellin | H04L 67/5681 |
| 2010/0064244 A1* | 3/2010 | Kilpatrick | H04M 1/0243 345/1.3 |
| 2013/0012273 A1 | 1/2013 | Sato | |
| 2013/0120294 A1* | 5/2013 | Sun | G06F 3/041 345/173 |
| 2013/0127918 A1* | 5/2013 | Kang | G06F 1/3265 345/660 |
| 2013/0275910 A1* | 10/2013 | Kim | G06F 1/1652 715/800 |
| 2013/0332811 A1* | 12/2013 | Chang | G06F 40/18 715/217 |
| 2014/0181725 A1 | 6/2014 | Yang et al. | |
| 2015/0026415 A1* | 1/2015 | Clausen | H04L 65/40 711/137 |
| 2016/0098348 A1* | 4/2016 | Burton | G06F 12/0215 711/137 |
| 2016/0364272 A1* | 12/2016 | Hou | G06F 9/5016 |
| 2017/0010689 A1* | 1/2017 | Bostick | G06T 3/40 |
| 2018/0143746 A1* | 5/2018 | Stern | H04L 67/535 |
| 2018/0293087 A1* | 10/2018 | Lee | G06F 9/445 |
| 2019/0026064 A1* | 1/2019 | Jeon | G09G 5/14 |
| 2019/0155619 A1 | 5/2019 | Chen | |
| 2019/0196860 A1* | 6/2019 | Bain | G06F 3/0647 |
| 2019/0347107 A1* | 11/2019 | Ma | G06F 11/34 |
| 2019/0347128 A1* | 11/2019 | Han | G06F 9/44578 |
| 2019/0354384 A1* | 11/2019 | Huang | G06F 9/44521 |
| 2019/0370021 A1* | 12/2019 | Chen | G06F 9/445 |
| 2020/0058272 A1* | 2/2020 | Oh | G09G 5/14 |
| 2020/0201518 A1 | 6/2020 | Jung et al. | |
| 2021/0336356 A1* | 10/2021 | Choi | G06F 1/1652 |
| 2022/0210264 A1 | 6/2022 | Jung et al. | |

FOREIGN PATENT DOCUMENTS

| | | | | |
|---|---|---|---|---|
| KR | 10-2014-0146992 A | 12/2014 | | |
| KR | 20140146992 A | 12/2014 | | |
| KR | 20150010563 A | 1/2015 | | |
| KR | 20150111158 A | * 10/2015 | | G06F 9/445 |
| KR | 20160123201 A | 10/2016 | | |
| KR | 20170039999 A | 4/2017 | | |
| KR | 20170043374 A | 4/2017 | | |
| KR | 20170058816 A | 5/2017 | | |
| KR | 20190025328 A | 3/2019 | | |
| KR | 20190105858 A | 9/2019 | | |
| WO | 2021060836 A1 | 4/2021 | | |

OTHER PUBLICATIONS

Juwan Yoo et al., Air Hook: Data Preloading User Interface, Oct. 1, 2012, International Conference on ICT Convergence (ICTC) pp. 163-167 (Year: 2012).*
Korean Office Action dated Oct. 25, 2023 for KR Application No. 10-2021-0013393.
International Search Report for PCT/KR2021/002952 mailed Aug. 30, 2021, 6 pages.
Written Opinion of the ISA for PCT/KR2021/002952 mailed Aug. 30, 2021, 4 pages.
Korean Notice of Patent Grant dated Jun. 12, 2024 for KR Application No. 10-2021-0013393.

* cited by examiner

METHOD FOR PRELOADING APPLICATION AND ELECTRONIC DEVICE SUPPORTING SAME

CROSS-REFERENCE TO RELATED APPLICATIONS

This application is a continuation of International Application No. PCT/KR2021/002952 filed on Mar. 10, 2021, designating the United States, and claiming priority to Korean Patent Application No. 10-2020-0166886 filed on Dec. 2, 2020, and to Korean Patent Application No. 10-2021-0013393 filed on Jan. 29, 2021, in the Korean Intellectual Property Office, the disclosures of all of which are hereby incorporated by reference herein in their entireties.

BACKGROUND

Field

Various example embodiments relate to a method for preloading an application and/or an electronic device supporting the same.

Description of Related Art

Electronic devices are now equipped with complex functions such as taking pictures and videos, playing music and video files, playing games, receiving broadcasts, supporting wireless Internet, etc., and are implemented in the form of comprehensive multimedia players. Accordingly, electronic devices are evolving in new forms from both hardware and software aspects to enhance portability and convenience while satisfying users' needs. As an example of this evolution, an electronic device may include a flexible display.

Electronic devices with flexible displays can provide both a wide screen and portability. When a portion of the display is rolled into the electronic device and the display is reduced, portability can be secured. When an area that can display a screen is expanded, a wide screen can be provided. Alternatively, electronic devices equipped with foldable displays can display a screen on a display area visually exposed to the outside when the electronic device is folded, and can display screen on a wider display area when the device is unfolded.

In addition, electronic devices are providing various functions or services based on digital convergence, which is the integration of various information and communication technologies. Accordingly, technologies for improving the performance of applications that are the central basis for the operation of the functions or services of the electronic devices are being proposed. For example, electronic devices can support a function of preloading at least some of applications into memory to improve the response speed to execution (or entry) requests of the applications.

SUMMARY

To improve the response speed of an application execution request in an electronic device, a processor may preload at least some of applications into a memory. At least some of the applications which are preloaded into the memory may be referred to as a preload process among processes for executing the application. Since the storage capacity of the memory is limited, the processor cannot preload all applications into the memory. Accordingly, when the usable space of the memory is insufficient, the processor may unload some of the applications loaded into the memory in order to preload the at least some of the applications into the memory. For example, using a least recently used (LRU) method, the processor can unload the application that has been loaded in the memory for the longest time among the at least some of the applications loaded into the memory, and load at least some of new applications.

However, when the preload operation is performed using the LRU method, the memory may load a preload process corresponding to an application not to be executed in the electronic device. In addition, the processor may not load a preload process corresponding to an application to be executed in the electronic device into the memory. As a result, smooth preload operation may not be performed, and the storage space of the memory may be wasted, resulting in reduced memory efficiency.

In accordance with an example embodiment, an electronic device may include: a housing including a first housing and a second housing movable with respect to the first housing; a flexible display in which a display area for displaying a screen is expanded or reduced as the second housing moves with respect to the first housing; a memory; and at least one processor configured to be electrically connected, directly or indirectly, to the flexible display and the memory, wherein the at least one processor may be configured to identify a change in the size of the display area based on the movement of the second housing relative to the first housing, determine an application to be preloaded from among a plurality of applications based on the identified size of the display area; load, into the memory, a preload process including some of resources for executing the determined application to be preloaded; and, in response to the occurrence of an event associated with the execution of the application to be preloaded, load an activity for the execution of the application by using the loaded preload process.

In accordance with another example embodiment, a method for operating an electronic device including a flexible display in which a display area for displaying a screen of the electronic device is expanded or reduced through a portion of a housing, and a memory according to an embodiment, may include: changing a size of the display area, determining an application to be preloaded from among a plurality of applications based on the changed size of the display area, loading, into a memory, a preload process including some of resources for executing the determined application to be preloaded, and, in response to the occurrence of an event associated with the execution of the application to be preloaded, generating a screen of the application for executing the application by using the loaded preload process.

According to various example embodiments, based on the preloading of the application, the time required for executing (or entering) an application may be reduced and the response speed of the electronic device may be improved.

An electronic device according to various example embodiments may determine an application to be preloaded based on the size of a display area that displays the screen of a flexible display. An application suitable for the situation in which the electronic device is used may be preloaded.

An electronic device according to various example embodiments may load, into a memory, a preload process corresponding to a highly executable application to be preloaded based on the size of a display area that displays the screen of a flexible display.

An electronic device according to various example embodiments may unload, from a memory, a preload process corresponding to an application that is not executable at a designated display size based on the size of a display area that displays the screen of a flexible display.

An electronic device according to various example embodiments may classify and manage at least one application to be preloaded for each size level of a designated display area.

An electronic device according to various example embodiments may secure memory capacity by unloading an unnecessary preload process from a memory.

BRIEF DESCRIPTION OF DRAWINGS

The above and other aspects, features and advantages of certain embodiments will be more apparent from the following detailed description, taken in conjunction with the accompanying drawings, in which.

DETAILED DESCRIPTION

Figure 1A:
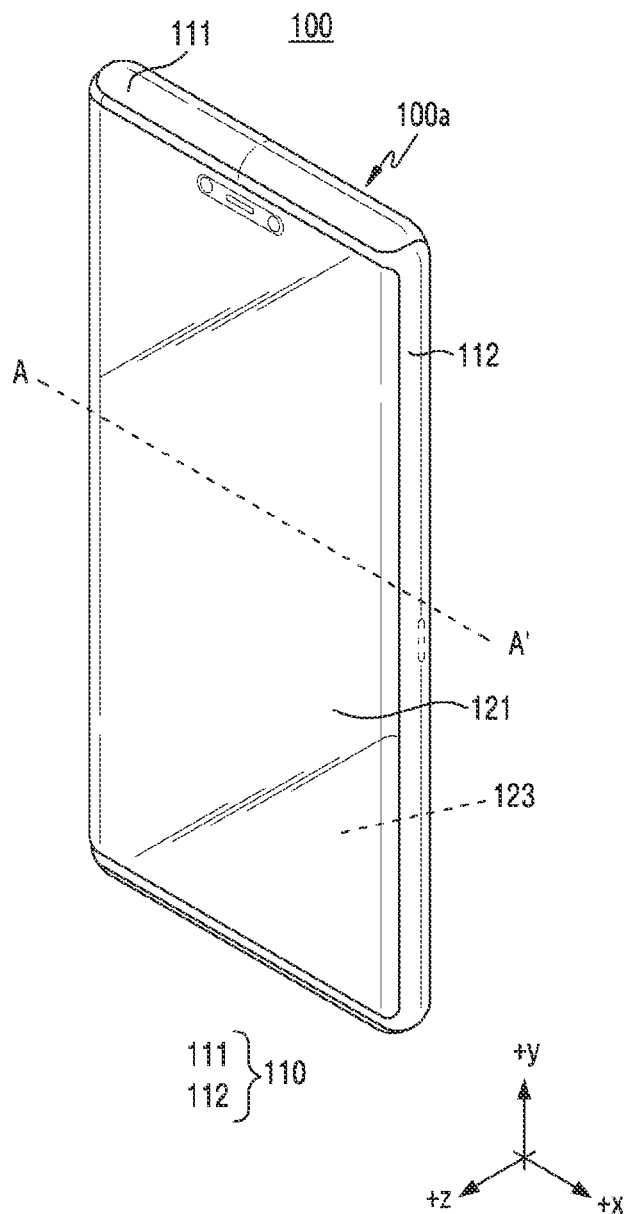
FIG. 1A is a front perspective view illustrating an electronic device in a first state (e.g., a reduced state) according to an example embodiment.
Figure 1B:
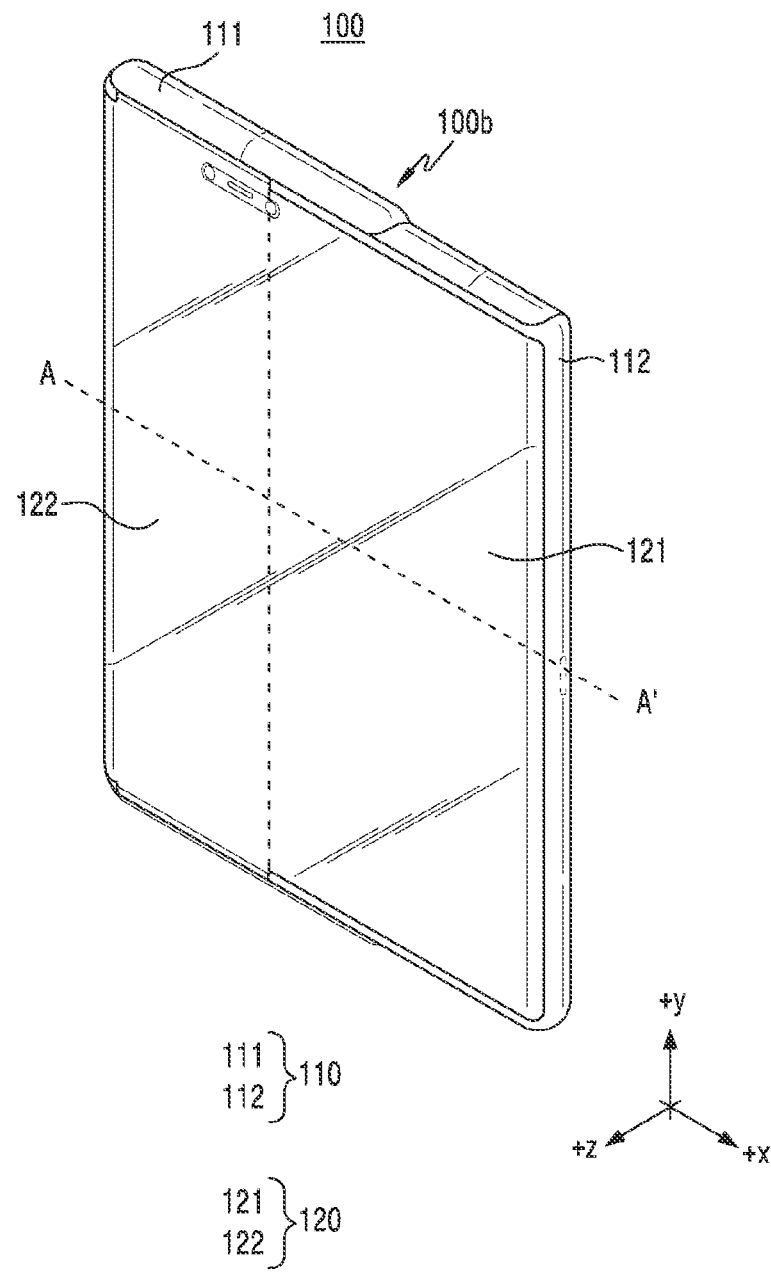
FIG. 1B is a front perspective view illustrating an electronic device in a second state (e.g., an extended state) according to an example embodiment.

FIG. 1A is a front perspective view illustrating an electronic device in a first state (e.g., a reduced state) according to an embodiment. FIG. 1B is a front perspective view illustrating an electronic device in a second state (e.g., an extended state) according to an embodiment.

According to various embodiments disclosed in this document, a surface facing substantially the same direction as a direction in which at least a portion (e.g., a first portion 121) of a flexible display 120 located outside an electronic device 100 may be defined as a front surface of the electronic device 100, and a surface opposite the front surface may be defined as a rear surface 123 of the electronic device 100. A surface surrounding the space between the front and rear surfaces may be defined as a side surface of the electronic device 100.

The flexible display 120 may be arranged on at least a portion of the electronic device 100 according to an embodiment. According to an embodiment, the flexible display 120 may be arranged to include at least some flat shapes and at least some curved shapes. According to an embodiment, the flexible display 120 and a housing 110 surrounding at least a portion of a periphery of the flexible display 120 may be arranged on the front surface of the electronic device 100.

According to an embodiment, the housing 110 may form a partial area of the front surface, and the rear and side surfaces of the electronic device 100. In an embodiment, the front surface of the electronic device 100 may refer to a surface of the electronic device 100 facing the +z direction of FIGS. 1A and 1B. In an embodiment, the rear surface of the electronic device 100 may indicate a surface of the electronic device 100 facing the −z direction in FIGS. 1A and 1B. In an embodiment, the side surface of the electronic device 100 may refer to a surface connecting the front and rear surfaces of the electronic device 100. According to another embodiment, the housing 110 may form a partial area of the side surface and the rear surface of the electronic device 100.

According to an embodiment, the housing 110 may include a first housing 111 and a second housing 112 movably coupled to the first housing 111 within a predetermined range.

According to an embodiment, the flexible display 120 may include a first portion 121 that can be coupled to the second housing 112 and a second portion 122 that extends from the first portion 121 and can be retracted into the electronic device 100.

According to an embodiment, the electronic device 100 may have a first state 100a and a second state 100b. For example, the first state 100a and second state 100b of the electronic device 100 may be determined based on the relative position of the second housing 112 with respect to the housing 110, and the state of the electronic device 100 may be changed between the first and second states 100a and 100b by user manipulation or mechanical operation.

According to an embodiment, the first state 100a of the electronic device 100 may refer to a state before the housing 110 is expanded, and the second state 100b of the electronic device 100 may refer to a state after the housing 110 is expanded.

According to an embodiment, when the electronic device 100 is switched from the first state 100a to the second state 100b according to the movement of the second housing 112, the second portion 122 of the flexible display 120 may be drawn out (or exposed) from the interior of the electronic device 100 to the outside. In an embodiment, that the flexible display 120 is drawn out may indicate that the flexible display 120 may be viewable from the outside of the electronic device 100. In another embodiment, when the electronic device 100 is switched from the second state 100b to the first state 100a according to the movement of the second housing 112, the second portion 122 of the flexible display 120 may be retracted into the electronic device 100. According to an embodiment, that the flexible display 120 is retracted into may indicate that the flexible display 120 may not be viewable from the outside of the electronic device 100.

According to an embodiment, a display area that is visually exposed to the outside in the first state 100a among the areas of the flexible display 120 may be expressed as a first display area. In addition, among the areas of the flexible display 120, a display area that is visually exposed to the outside due to the transition from the first state 100a to the second state 100b may be expressed as a second display area. Finally, among the areas of the flexible display 120, an area of the flexible display 120 provided in a curved shape at a position close to a position where the flexible display 120 is drawn out may be expressed as a third display area.

Figure 2A:
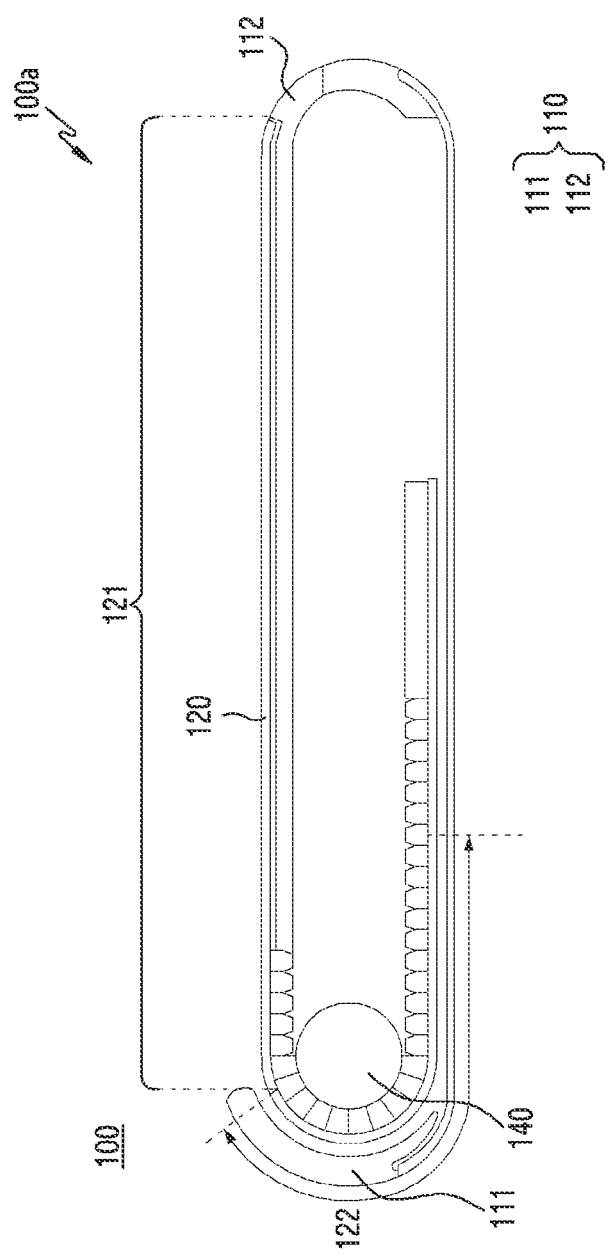
FIG. 2A is a side cross-sectional view illustrating an electronic device in a first state according to an example embodiment.
Figure 2B:
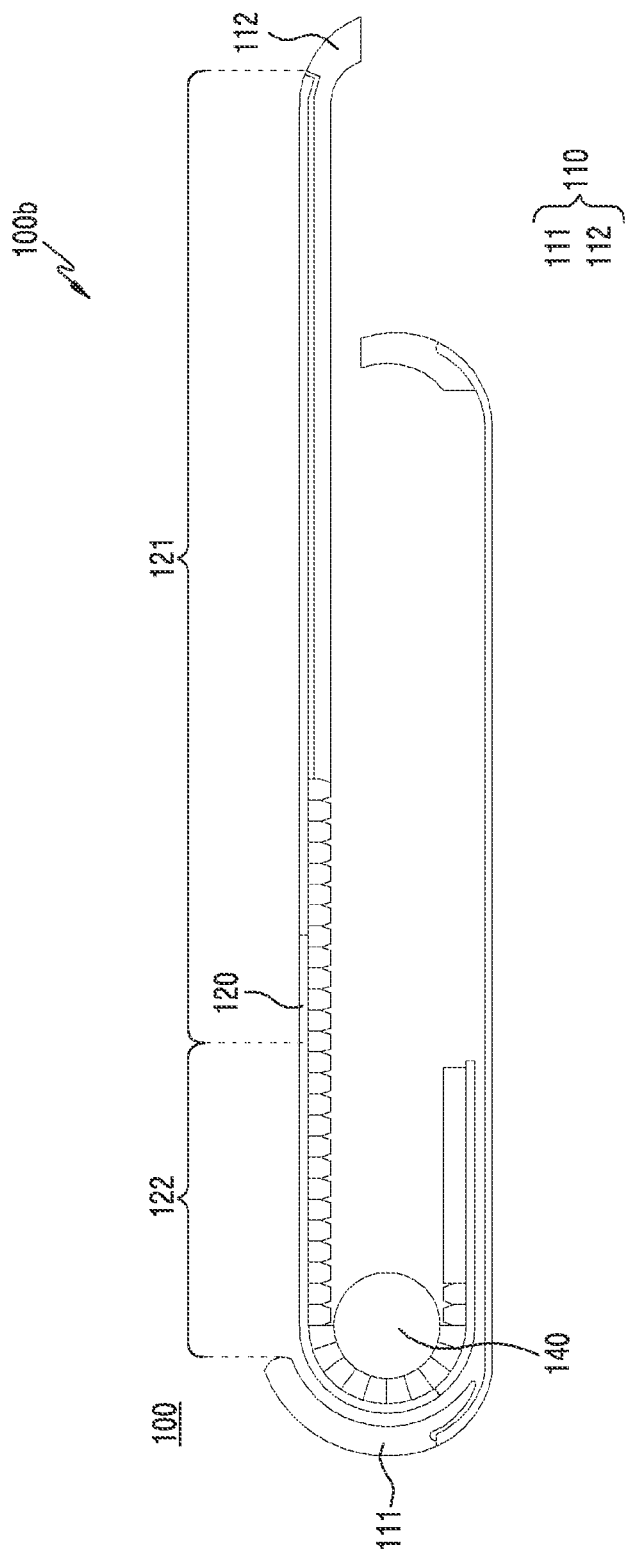
FIG. 2B is a side cross-sectional view illustrating an electronic device in a second state according to an example embodiment.

FIG. 2A is a side cross-sectional view illustrating an electronic device in a first state according to an embodiment. FIG. 2B is a side cross-sectional view illustrating an electronic device in a second state according to an embodiment.

FIG. 2A is a cross-sectional view showing the electronic device of FIG. 1A or FIG. 1B cut along line A-A' in an embodiment. FIG. 2B is a cross-sectional view showing the electronic device of FIG. 1B cut along line A-A' in an embodiment. In an embodiment, a first state 100a may refer to a normal state, a reduced state, or a closed state, and a second state 100b may refer to an extended state or an open state.

The electronic device 100 in FIGS. 2A and 2B may include various components. In relation to the description of FIGS. 2A and 2B, contents overlapping with those described above may be simplified or omitted.

Referring to FIGS. 2A and 2B, the electronic device 100 may include a housing 110 including a first housing 111 and a second housing 112 that is slidable relative to the first housing 111. The housing 110 may be expanded or reduced according to the sliding of the second housing 112 with respect to the first housing 111.

In an embodiment, the electronic device 100 may include a flexible display 120. The flexible display 120 may be connected, directly or indirectly, to the second housing 112 and may be expanded or reduced according to the sliding of the second housing 112 with respect to the first housing 111. For example, when the housing 110 is maximally or largely reduced, a first portion 121 of the flexible display 120 may be exposed outside the electronic device 100, and when the housing 110 is maximally or largely expanded, both the first portion 121 and a second portion 122 of the display 120 may be visually exposed outside the electronic device 100.

According to an embodiment, the electronic device 100 may include a rotating structure 140. The rotating structure 140 may move the second housing 112 relative to the first housing 111. For example, the rotating structure 140 may include a motor and may use the motor to expand or reduce the size of the flexible display 120 that is visually exposed to the outside of the electronic device 100. According to an embodiment, the flexible display 120 may be rolled up while encompassing the rotating structure 140 as the first housing 111 and the second housing 112 move relative to each other.

Figure 3A:
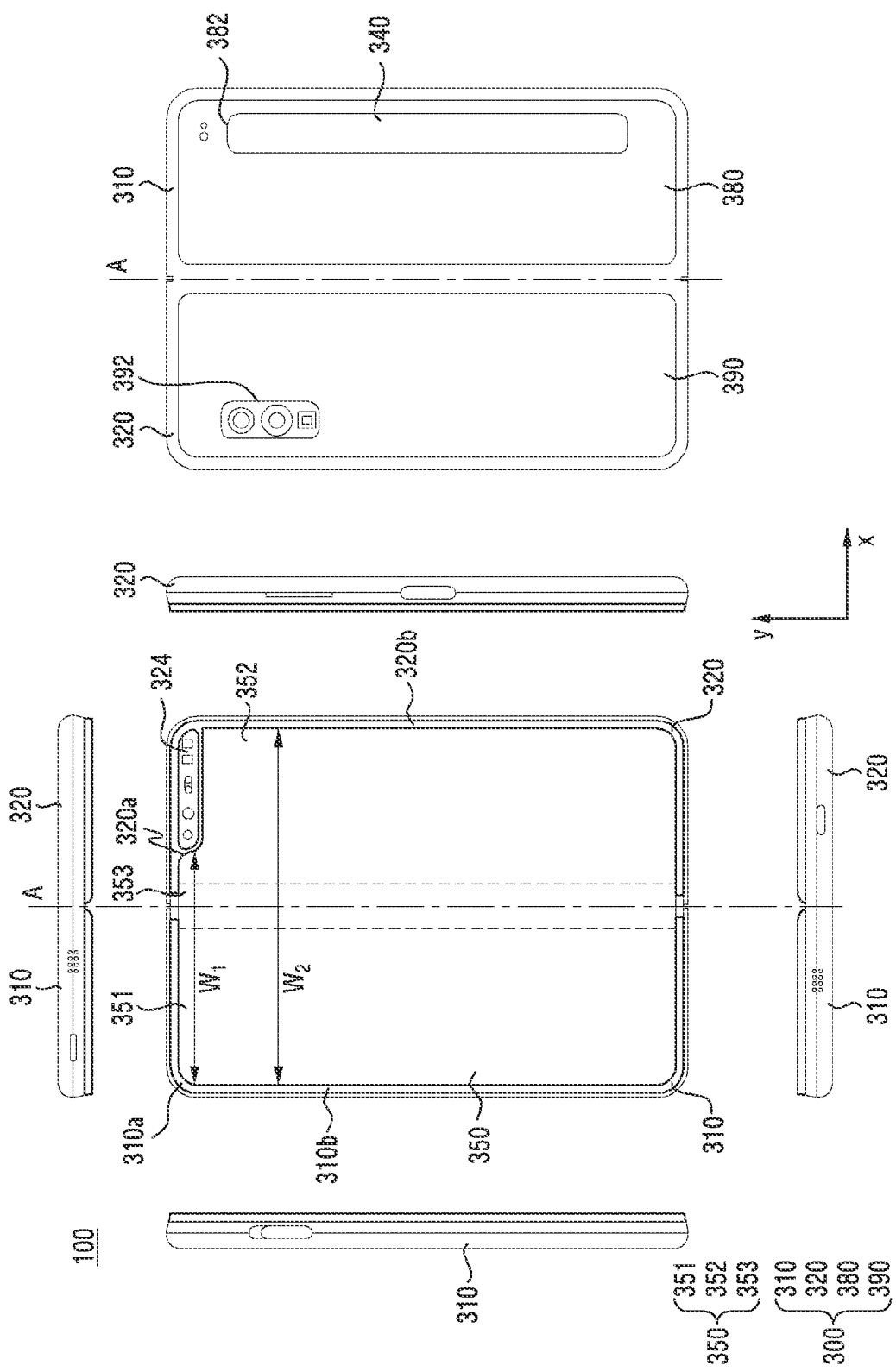
FIG. 3A illustrates a flat state of an electronic device according to another example embodiment.
Figure 3B:
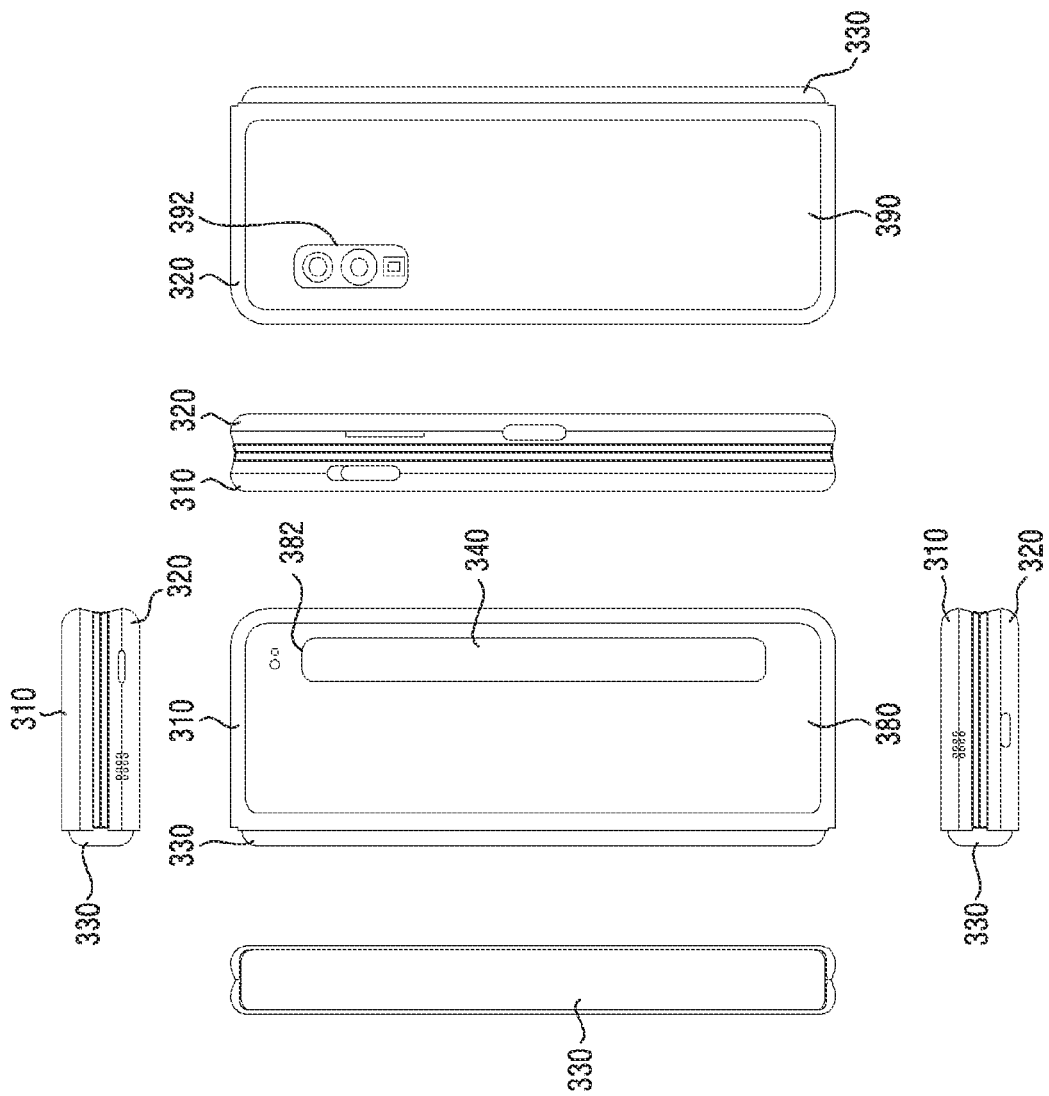
FIG. 3B illustrates a folded state of an electronic device according to another example embodiment.

FIG. 3A illustrates a flat state of an electronic device according to another embodiment. FIG. 3B illustrates a folded state of an electronic device according to another embodiment.

Referring to FIGS. 3A and 3B, in another embodiment, the electronic device 100 may include a foldable housing 300, a hinge cover 330 that covers a foldable portion of the foldable housing 300, and a flexible or foldable display 350 (hereinafter, "display" 350 for short) that is disposed in the space formed by the foldable housing 300. The display 350 according to an embodiment may correspond to the flexible display 120 described with reference to FIG. 1A. In this document, a surface on which the display 350 is disposed is defined as a first surface or a front surface of the electronic device 100, and a surface opposite the front surface is defined as a second surface or a rear surface of the electronic device 100. In addition, a surface surrounding the space between the front and rear surfaces is defined as a third surface or a side surface of the electronic device 100.

In an embodiment, the foldable housing 300 may include a first housing structure 310 (hereinafter referred to as "first housing" 310), a second housing structure 320 (hereinafter referred to as "second housing" 320) including a sensor area 324, a first rear cover 380, and a second rear cover 390. The foldable housing 300 of the electronic device 100 is not limited to FIG. 2 and the shape and combination shown in FIG. 2, and may be implemented by other shapes or combinations and/or coupling of components. For example, in another embodiment, the first housing 310 and the first rear cover 380 may be integrally formed, and the second housing 320 and the second rear cover 390 may be integrally formed.

In the illustrated embodiment, the first housing 310 and the second housing 320 may be arranged on both sides with respect to a folding axis (axis A) and have a generally symmetrical shape with respect to the folding axis A. As will be described later, the angles or distances between the first housing 310 and the second housing 320 may vary depending on whether the electronic device 100 is in a flat state, a folded state, or an intermediate state. In the illustrated embodiment, unlike the first housing 310, the second housing 320 may additionally include a sensor area 324 where various sensors are arranged, but other areas may have mutually symmetrical shapes.

In an embodiment, as illustrated in FIG. 3A, the first housing 310 and the second housing 320 may together form a recess accommodating the display 350. In the illustrated embodiment, due to the sensor area 324, the recess may have two or more different widths in a direction perpendicular to the folding axis A.

For example, the recess may have a first width w1 defined between a first portion 310a parallel to the folding axis A of the first housing 310 and a first portion 320a formed at the periphery of the sensor area 324 of the second housing 320, and a second width w2 defined by a second portion 320b parallel to the folding axis A while not corresponding to the sensor area 324 from the first housing 310 and the second housing 320. For example, the second width w2 may be longer than the first width w1. For example, the first portion 310a of the first housing 310 and the first portion 320a of the second housing 320 having mutually asymmetrical shapes may form the first width w1 of the recess, and the second portion 310b of the first housing 310 and the second portion 320b of the second housing 320 having mutually symmetrical shapes may form the second width w2 of the recess. In an embodiment, the first portion 320a and the second portion 320b of the second housing 320 may have different distances from the folding axis A. The width of the recess is not limited to the illustrated example. In various embodiments, the recess may have a plurality of widths due to the shape of the sensor area 324 or the asymmetrical shape of the first housing 310 and the second housing 320.

In an embodiment, at least a portion of the first housing 310 and the second housing 320 may be made of a metal material or a non-metal material having a rigidity of a size selected to support the display 350.

In an embodiment, the sensor area 324 may be provided to have a predetermined area adjacent to a corner of the second housing 320. However, the arrangement, shape, and size of the sensor area 324 are not limited to the illustrated examples. For example, in another embodiment, the sensor area 324 may be provided in another corner of the second housing 320 or in an arbitrary area between the top and bottom corners of the second housing 320. In an embodiment, various components embedded in the electronic device 100 for performing various functions may be visually exposed on the front surface of the electronic device 100 through the sensor area 324 or one or more openings provided in the sensor area 324. In various embodiments, the components may include various types of sensors. The sensors may include, for example, at least one of a front camera, a receiver, or a proximity sensor.

The first rear cover 380 may be arranged on one side of the folding axis of the electronic device 100 on the rear surface of the electronic device 100, and for example, may have a substantially rectangular periphery, and the periphery may be enclosed by the first housing 310. Similarly, the second rear cover 390 may be arranged on the other side of the folding axis of the electronic device 100 on the rear surface of the electronic device 100 and a periphery of the second rear cover 390 may be enclosed by the second housing 320.

In the illustrated embodiment, the first rear cover 380 and the second rear cover 390 may have substantially symmetrical shapes around the folding axis (A axis). However, the first rear cover 380 and the second rear cover 390 do not necessarily have symmetrical shapes, and in another embodiment, the electronic device 100 may include various shapes of the first rear cover 380 and the second rear cover 390. In another embodiment, the first rear cover 380 may be integrally formed with the first housing 310, and the second rear cover 390 may be integrally formed with the second housing 320.

In an embodiment, the first rear cover 380, the second rear cover 390, the first housing 310, and the second housing 320 may form the space in which various components (e.g., printed circuit board or battery) of the electronic device 100 can be arranged. In an embodiment, one or more components may be arranged or visually exposed on the rear surface of the electronic device 100. For example, at least a portion of a sub display 340 may be visually exposed through the first rear area 382 of the first rear cover 380. In another embodiment, one or more components or sensors may be visually exposed through the second rear area 392 of the second rear cover 390. In various embodiments, the sensor may include a proximity sensor and/or a rear camera.

Referring to FIG. 3B, a hinge cover 330 may be arranged between the first housing 310 and the second housing 320 to cover internal components (e.g., a hinge structure). In an embodiment, the hinge cover 330 may be covered by a portion of the first housing 310 and the second housing 320 or may be exposed to the outside, according to the state (flat state or folded state) of the electronic device 100.

For example, as shown in FIG. 3A, when the electronic device 100 is in a flat state, the hinge cover 330 may not be exposed because the hinge cover 330 is covered by the first housing 310 and the second housing 320. For example, as shown in FIG. 3, when the electronic device 100 is in a folded state (e.g., a fully folded state), the hinge cover 330 may be exposed to the outside between the first housing 310 and the second housing 320. For example, when the first housing 310 and the second housing 320 are in an intermediate state where the first housing 310 and the second housing 320 are folded with a certain angle, the hinge cover 330 may be partially exposed to the outside between the first housing 310 and the second housing 320. However, in this case, the exposed area may be smaller than that in the fully folded state. In an embodiment, the hinge cover 330 may include a curved surface.

The display 350 may be arranged on the space formed by the foldable housing 300. For example, the display 350 may be seated on the recess formed by the foldable housing 300 and may constitute most of the front surface of the electronic device 100.

Accordingly, the front surface of the electronic device 100 may include the display 350, a partial area of the first housing 310 adjacent to the display 350, and a partial area of the second housing 320. In addition, the rear surface of the electronic device 100 may include the first rear cover 380, a partial area of the first housing 310 adjacent to the first rear cover 380, the second rear cover 390, and a partial area of the second housing 320 adjacent to the second rear cover 390.

The display 350 may refer to a display in which at least a partial area can be deformed into a flat or curved surface. In an embodiment, the display 350 may include a folding area 353, a first display area arranged on one side (e.g., the left side of the folding area 353 shown in FIG. 2) with respect to the folding area 353, and a second display area 352 arranged on the other side (e.g., the right side of the folding area 353 shown in FIG. 2).

The area division of the display 350 shown in FIG. 3A is merely an example, and the display 350 may be divided into a plurality of areas (e.g., four or more areas or two areas) based on the structure or function of the display. For example, in the embodiment shown in FIG. 3A, the area of the display 350 may be divided by the folding area 353 extending parallel to the y-axis or the folding axis (A-axis). However, in other embodiments, the area of the display 350 may be divided with respect to different folding areas (e.g., folding area extending parallel to the x-axis) or different folding axes (e.g., folding axis extending parallel to the x-axis).

The first display area 351 and the second display area 352 may have generally symmetrical shapes with respect to the folding area 353. However, unlike the first display area 351, the second display area 352 may include a notch cut according to the presence/absence of the sensor area 324, but in other areas, the second display area 352 may have a shape symmetrical to that of the first display area 351. For example, the first display area 351 and the second display area 352 may include a portion having a shape symmetrical to each other and a portion having a shape asymmetrical to each other.

Hereinafter, operations of the first housing 310 and the second housing 320 and each area of the display 350 according to the state of the electronic device 100 (e.g., a flat state and a folded state) will be described.

In an embodiment, when the electronic device 100 is in a flat state (e.g., FIG. 3A), the first housing 310 and the second housing 320 may form an angle of 180 degrees and may be arranged to face the same direction. The surface of the first display area 351 and the surface of the second display area 352 of the display 350 may form 180 degrees therebetween and may face the same direction (e.g., the front direction of the electronic device). The folding area 353 may form the same plane as the first display area 351 and the second display area 352.

In an embodiment, when the electronic device 100 is in a folded state (e.g., FIG. 3B), the first housing 310 and the second housing 320 may be arranged to face each other. The surface of the first display area 351 and the surface of the second display area 352 of the display 350 may form a narrow angle (e.g., between 0 degrees and 10 degrees) therebetween and may face each other. At least a portion of the folding area 353 may be formed of a curved surface having a predetermined curvature.

In an embodiment, when the electronic device 100 is in an intermediate state (e.g., FIG. 3B), the first housing 310 and the second housing 320 may be arranged at a certain angle therebetween. The surface of the first display area 351 and the surface of the second display area 352 of the display 350 may form an angle greater than that in the folded state and smaller than that in the flat state. At least a portion of the folding area 353 may be formed of a curved surface having a predetermined curvature, and the curvature at this time may be smaller than that in the folded state.

Figure 4:
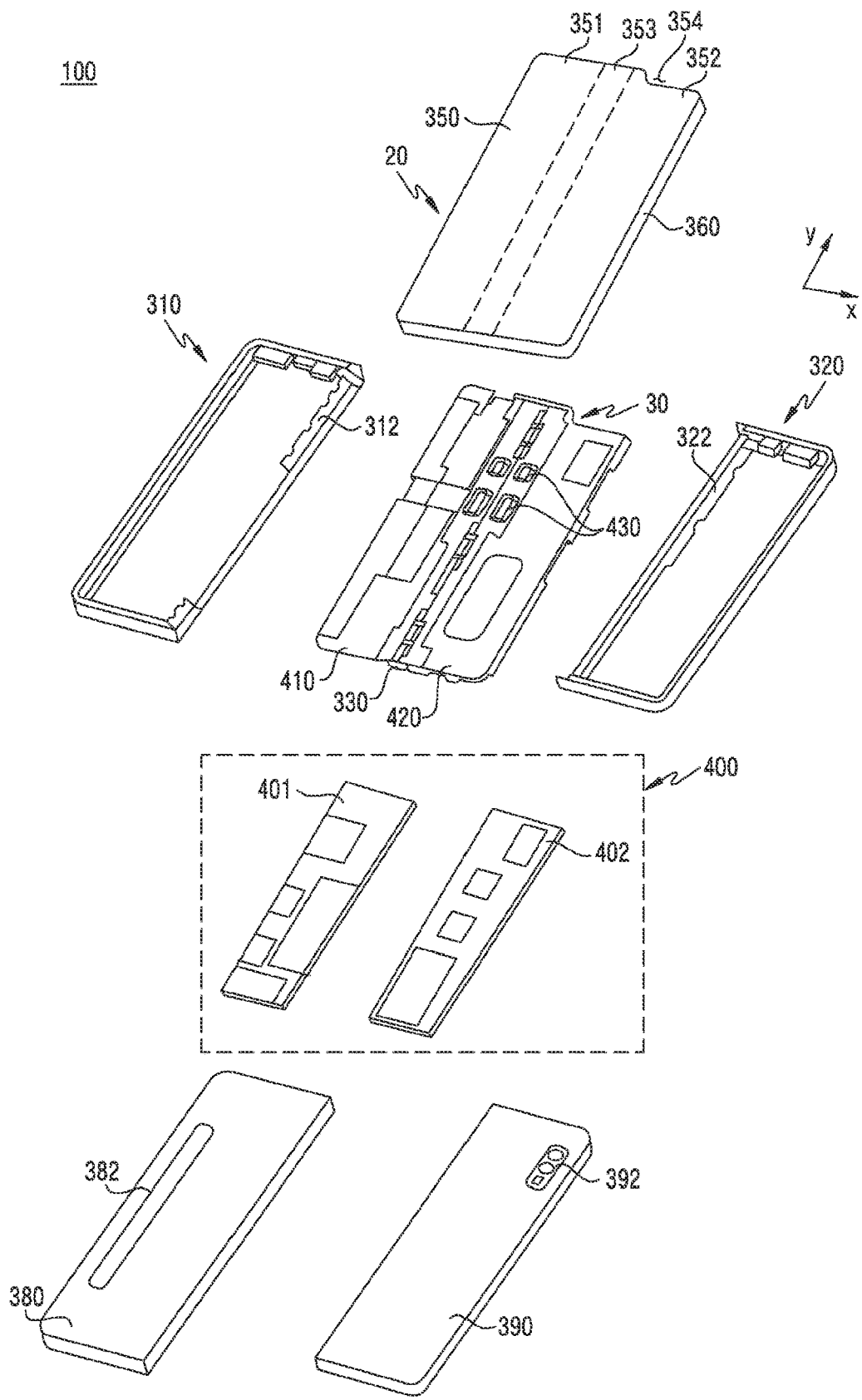
FIG. 4 is an exploded perspective view illustrating an electronic device according to another example embodiment.

FIG. 4 is an exploded perspective view illustrating an electronic device according to another embodiment.

Referring to FIG. 4, in an embodiment, the electronic device 100 may include a display unit 20, a bracket assembly 30, a substrate unit 400, a first housing 310, a second housing 320, a first rear cover 380, and a second rear cover 390. In this document, the display unit 20 may be referred to as a display module or a display assembly.

The display unit 20 may include a display 350 and one or more plates or layers on which the display 350 is seated. In an embodiment, the plate 360 may be arranged between the display 350 and the bracket assembly 30. The display 350 may be arranged on at least a portion of one surface (e.g., the upper surface of FIG. 4) of the plate 360. The plate 360 may be formed in a shape corresponding to that of the display 350. For example, a partial area of the plate 360 may be formed in a shape corresponding to the notch 354 of the display 350.

The bracket assembly 30 may include a first bracket 410, a second bracket 420, a hinge structure (or hinge unit) that is arranged between the first bracket 410 and the second bracket 420, a hinge cover 330 that covers the hinge structure when viewed from the outside, and a wiring member 430 (e.g., flexible printed circuit {FPC}) that crosses the first bracket 410 and the second bracket 420.

In an embodiment, the bracket assembly 30 may be arranged between the plate 360 and the substrate unit 400. For example, the first bracket 410 may be arranged between the first display area 351 of the display 350 and a first substrate 401. The second bracket 420 may be arranged between the second display area 352 of the display 350 and a second substrate 402.

In an embodiment, the wiring member 430 and at least a portion of the hinge structure may be arranged inside the bracket assembly 30. The wiring member 430 may be arranged in a direction (e.g., the x-axis direction) crossing the first bracket 410 and the second bracket 420. The wiring member 430 may be arranged in a direction (e.g., the x-axis direction) perpendicular to the folding axis (e.g., the y-axis or the folding axis A of FIG. 3A) of the folding area 353 of the electronic device 100.

As described above, the substrate unit 400 may include the first substrate 401 arranged on the side of the first bracket 410 and the second substrate 402 arranged on the side of the second bracket 420. The first substrate 401 and the second substrate 402 may be arranged inside the space formed by the bracket assembly 30, the first housing 310, the second housing 320, the first rear cover 380, and the second rear cover 390. Components for implementing various functions of the electronic device 100 may be arranged on the first substrate 401 and the second substrate 402.

The first housing 310 and the second housing 320 may be assembled to each other to be coupled, directly or indirectly, to both sides of the bracket assembly 30 while the display unit 20 is coupled, directly or indirectly, to the bracket assembly 30. As will be described later, the first housing 310 and the second housing 320 may slide from both sides of the bracket assembly 30 and be coupled, directly or indirectly, to the bracket assembly 30.

In an embodiment, the first housing 310 may include a first rotational support surface 312, and the second housing 320 may include a second rotational support surface 322 corresponding to the first rotation support surface 312. The first rotational support surface 312 and the second rotational support surface 322 may include a curved surface corresponding to the curved surface included in the hinge cover 330.

In an embodiment, when the electronic device 100 is in the flat state (e.g., the electronic device of FIG. 3A), the first rotational support surface 312 and the second rotational support surface 322 may cover the hinge cover 330 so that the hinge cover 330 may not be exposed to the rear surface of the electronic device 100 or minimally exposed thereto. Meanwhile, when the electronic device 100 is in the folded state (e.g., the electronic device of FIG. 3B), the first rotational support surface 312 and the second rotational support surface 322 may rotate along the curved surface included in the hinge cover 330 so that the hinge cover 330 may be maximally or largely exposed to the rear surface of the electronic device 100.

Figure 5:
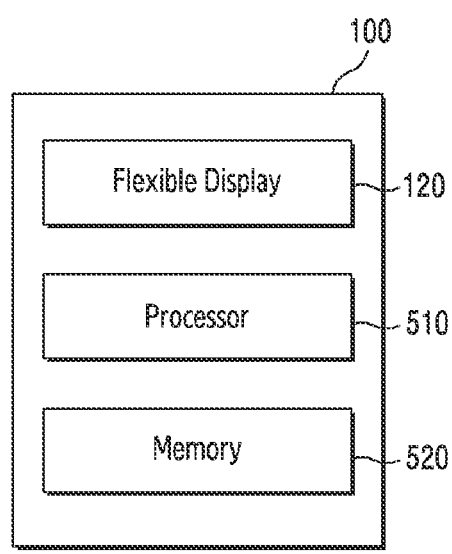
FIG. 5 is a block diagram illustrating an electronic device according to an example embodiment.

FIG. 5 is a block diagram illustrating an electronic device according to an embodiment.

Referring to FIG. 5, the electronic device 100 may include a flexible display 120 (e.g., the display 350 of FIG. 3A), a processor 510, a memory 520, or a combination thereof. According to various embodiments, the electronic device 100 may include additional components in addition to the components shown in FIG. 5.

According to an embodiment, the processor 510 may be electrically or operatively connected, directly or indirectly, to the flexible display 120 and the memory 520. According to an embodiment, the processor 510 may execute calculations or data processing related to control and/or communication of at least one other component of the electronic device 100 using instructions stored in the memory 520 of the electronic device 100. According to an embodiment, the processor 510 may include at least one of a central processing unit (CPU), a graphics processing unit (GPU), a micro controller unit (MCU), a sensor hub, a supplementary processor, a communication processor, an application processor, an application specific integrated circuit (ASIC), and a field programmable gate array (FPGA), and may include a plurality of cores.

According to an embodiment, the flexible display 120 may display various contents (e.g., text, image, video, icon, and/or symbol). According to an embodiment, the flexible display 120 may include a liquid crystal display (LCD), a light emitting diode (LED) display, or an organic light emitting diode (OLED) display. According to an embodiment, the flexible display 120 may output a screen having a size corresponding to an area determined to be visually exposed to the outside. For example, the flexible display 120 may control an area of the flexible display 120 that is determined to be visually exposed to the outside to be in an active state. In addition, the flexible display 120 may control an area other than the area determined to be visually exposed to the outside to be in an inactive state. In this document, the term "active state" for an area of a flexible display may indicate a state in which the screen is output or can be output through at least a portion of the area. The term "inactive state" for the area of the flexible display may indicate a state in which the screen is not output on at least a portion of the area. For example, the inactive state may indicate a state in which power is not supplied to a display element included in the area or a state in which a black screen is displayed in the area. In this document, the size of the display area may indicate the size of an area controlled to be in the activate state from the area of the flexible display.

According to an embodiment, the size of the display area of the flexible display 120 may change as at least a portion of the housing 110 moves. For example, as the second housing 112 moves relative to the first housing 111 (e.g., see FIG. 1), the display area displaying the screen may be expanded or reduced.

According to an embodiment, the memory 520 may store instructions that allow the processor 510 to process data or control components of the electronic device 100 to perform the operation of the electronic device 100 when executed. The memory 520 may include a secure area or a separate secure storage medium (e.g., a secure memory area accessible only through a secure OS {e.g., a trust zone}). According to an embodiment, the memory 520 may include a nonvolatile memory area and a volatile memory area. According to an embodiment, the nonvolatile memory area of the memory 520 may be expressed as a storage device. According to an embodiment, the memory 520 may include memory areas respectively corresponding to applications executed in the electronic device 100. In an embodiment, the memory areas respectively corresponding to the applications may store data based on each application. In an embodiment, the processor 510 may use data based on the application stored in the memory 520 to execute the application.

According to an embodiment, the processor 510 may load application data (e.g., an application package {APK} file) for an application stored in the partial area of the memory 520 into an area different from the partial area of the memory 520. For example, the processor 510 may load an application data for an application stored in the nonvolatile memory of the memory 520 into the volatile memory of the memory 520. According to an embodiment, an operation of the processor 510 loading the application data into the volatile memory may be expressed as an application preload. According to an embodiment, the application data loaded into the volatile memory area for the execution of the application may be expressed as a preload process. For example, the preload process may be an empty process that is loaded into the memory in a state in which an activity and an application component are excluded from among various states of an application process executed on an operating system. The activity may refer to a basic unit of an application constituting a screen with a view and a view group, which are data structures for storing layout and information. For example, the activity may refer to a unit that displays a user interface component on one screen and processes a response of a system or a user. For example, the activity may refer to a component that provides a user interface screen of an application. The preload process may be maintained in the memory even when the application is not actually executed. According to an embodiment, the processor 510 may execute the application based on the preload process loaded into the memory 520 to execute the application. For example, the processor 510 may execute the application by using the preload process corresponding to the application stored in the nonvolatile memory area of the memory 520 based on an application execution command. By executing the application using the preload process, the processor 510 may omit a process of generating a new process and loading the generated process into the memory, and may execute the application.

According to an embodiment, the processor 510 may identify a change in the size of the display area that displays the screen of the flexible display 120 based on the movement of the second housing 112 relative to the first housing 111. For example, the processor 510 may identify that the size of the display area based on the movement of at least a portion of the housing 110 has been changed. In addition, the processor 510 may identify whether the size of the display area is reduced or expanded. According to an embodiment, the processor 510 may designate a size level of the display area. In an embodiment, the processor 510 may identify that the size of the display area is changed based on the movement of the at least a portion of the housing 110, and may determine the size level of the display area corresponding to the changed size of the display area.

According to an embodiment, the processor 510 may determine an application to be preloaded from among a plurality of applications stored in the memory 520 based on the identified size of the display area. For example, the processor 510 may determine an application to be preloaded into the volatile memory area among the plurality of applications stored in the nonvolatile memory area of the memory 520 based on the identified size of the display area. According to various embodiments, the processor 510 may determine the application to be preloaded in the volatile memory area based on the identified size of the display area through various methods.

According to an embodiment, the processor 510 may determine the application to be preloaded, and may load a preload process including some of resources for executing the determined application to be preloaded into the memory 520. According to an embodiment, the types of applications to be preloaded may vary. For example, process data of a system application corresponding to the application to be preloaded may be loaded, process data of at least one service application may be loaded, and process data of a background application may be loaded.

According to an embodiment, the resources for executing the application to be preloaded may include an application package file and/or a file including at least a portion of an application execution code (e.g., APK, dalvik executable format {dex}, or optimized dex {odex}). According to an embodiment, the preload process including some of the resources for executing the application to be preloaded may include various types. For example, the preload process may include a seed process that includes generating an application thread (ActivityThread) among operations for executing an application and generating a binder for initial setting and communication for executing the application, an empty process that includes calling start/execution method (onCreate) of the application in addition to the operation included in the seed process, or a cached process that includes up to a UI frame rendering operation for executing the application in addition to the empty process. As the above-described preload process, an example of an application execution operation of a specific operating system (e.g., Android™) is illustrated, but the disclosure is not limited thereto. For example, the electronic device 100 may include various operating systems (e.g., Android™, Ubuntu™, iOS™, or Windows™), and the above-described application preload process execution operation according to the installed operating system may be at least partially changed (e.g., operation name or operation sequence).

According to an embodiment, the empty process may represent a process loaded into the memory 520 in a state in which there is no activity and application component among various states of the process executed on the operating system.

According to an embodiment, the resources for executing the application to be preloaded may include, in addition to the processes described above, an activity in which the actual operation is implemented as a component for providing a UI screen of the application to be preloaded, I/O-related resources that include all contents in which necessary I/O occurs while the application to be preloaded is executed, and/or resources for securing a memory to be used by the application to be preloaded in advance. Accordingly, the preload process may include at least one of the resources corresponding to the above-described application to be preloaded. According to various embodiments, the resources corresponding to the application to be preloaded may vary according to the type of the application, and may additionally include resources when it is determined that there are more resources necessary for execution of the application.

According to an embodiment, the activity may indicate a basic unit (e.g., a unit that displays a user interface component on the screen as a single screen and processes system or user reactions) of the application constituting the screen with a view and a view group, which are data structures for storing layout information.

According to an embodiment, the processor 510 may load an activity for the execution of the application using the preload process loaded into the memory 520 in response to the occurrence of an event associated with the execution of the application to be preloaded. For example, the processor 510 may load resources required during the execution of the application or information required for various calculation operations into the volatile memory area of the memory 520 prior to the execution of the application to be preloaded, thereby improving the execution (or entry) speed of the application.

According to an embodiment, the loading the activity may include executing an application, generating a screen of the application, or an operation of generating the screen of the application (e.g., in the memory). According to various embodiments, the loading the activity is not limited to a specific operating system and may be performed based on various operating systems. Without limitation to the operating system, when an operation similar to the above operations is included, it may correspond to the loading the activity.

According to an embodiment, the processor 510 may determine the state of the memory 520 by monitoring an operation pattern of the memory 520. For example, the processor 510 may compare the size of the remaining space compared to the total capacity of the nonvolatile memory area of the memory 520 and the size thereof is less than or equal to a reference value. According to an embodiment, the processor 510 may determine the state of the memory based on a ratio of the capacity of the nonvolatile memory being used or a ratio of the available capacity of the nonvolatile memory compared to the total capacity of the nonvolatile memory area.

According to an embodiment, the processor 510 may determine the remaining capacity of the memory 520 and determine the preload process among the resources for executing the application to be preloaded based on the remaining capacity of the memory 520. For example, the processor 510 may determine the type of the preload process corresponding to the application to be preloaded based on the size of the space available in the nonvolatile memory area. For example, when the available space of the memory 520 is large, the processor 510 may load the preload process (e.g., the cached process or I/O) having relatively large capacity into the non-volatile memory area. As another example, when the available space of the memory 520 is small, the processor 510 may load the preload process (e.g., the seed process or the empty process) having relatively small capacity into the nonvolatile memory area.

Figure 6:
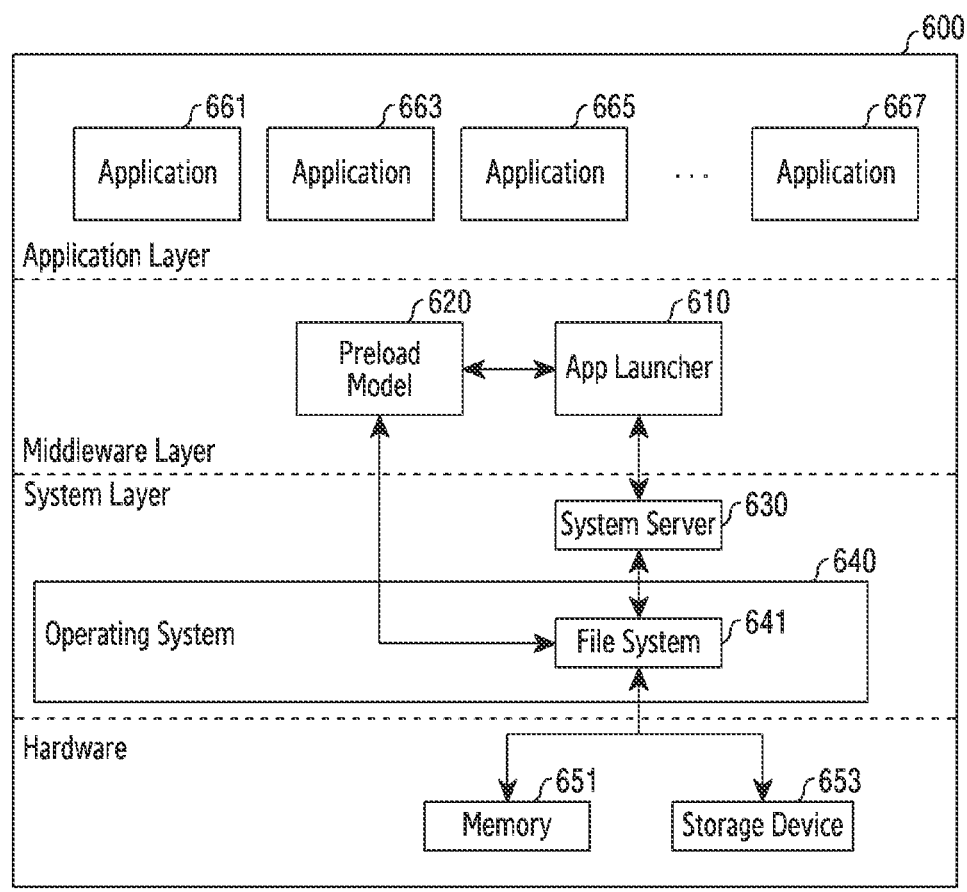
FIG. 6 is a block diagram illustrating an example of a configuration of an electronic device according to an example embodiment.

FIG. 6 is a block diagram illustrating an example of a configuration of an electronic device according to an embodiment.

According to an embodiment, FIG. 6 is a block diagram 600 illustrating an example of a configuration of the electronic device 100. Components of an application layer, a middleware layer, or a system layer of FIG. 6 may be at least partially the same as a program 1440 described below with reference to FIG. 14.

Referring to FIG. 6, the configuration of the electronic device 100 may include at least one of an application layer, a middleware layer, a system layer, or hardware. In an embodiment, the application layer may include a plurality of applications 661 to 667, and the middleware layer may include at least one of an app launcher 610 and a preload model 620. In addition, the kernel layer may include a system server 630 and an operating system 640 including a file system 641, and the hardware may include at least one of a memory 651 or a storage device 653. According to an embodiment, at least one of the plurality of applications 661 to 667, the app launcher 610, the preload model 620, the system server 630, the file system 641, or the operating system 640 may be included in the program 1440 described later with reference to FIG. 14.

In an embodiment, the app launcher 610 may display screens (e.g., a home screen and an apps screen) provided by the app launcher 610 on the flexible display 120 of the electronic device 100, and may request, from the system server 630, the execution of an application (e.g., at least one of the plurality of applications 661 to 667) indicated by an executable object (e.g., icon) based on an input to the executable object (e.g., icon) included in the screen. In various embodiments, when the application (e.g., application 661) indicated by the executable object is executed, the app launcher 610 may transmit information on the execution of the application (e.g., application 661) to the preload model 620. In various embodiments, the electronic device 100 may update recent usage information (e.g., update an LRU list) based on the information on the execution of the application (e.g., the application 661). Based on the updated recent usage information, the preload model 620 may be updated.

According to an embodiment, the preload model 620 may include data for determining the application to be preloaded among the plurality of applications, using at least one of driving information on each of the plurality of applications stored in the memory 520/651, information indicating the number of executions, the number of notifications for the application, or information indicating the order according to the recent usage of the applications. Hereinafter, in the disclosure, information on each of the plurality of applications described above may be expressed as application execution information. In addition, the electronic device 100 may determine the application to be preloaded based on the size of the display area using the preload model 620. According to an embodiment, the preload model 620 may manage the application to be preloaded among the plurality of applications based on the size of the display area. A detailed description of this will be described later with reference to FIG. 8A.

According to an embodiment, in the preload model 620, the number of applications to be preloaded may be determined based on a size allocated in the memory 520 (e.g., the nonvolatile memory area) to load the preload process. For example, when the size of the area allocated for preloading in the memory 520 is one gigabyte (GB) and the size of the preload process of the application to be preloaded is 100 megabytes (MB), the number of applications to be preloaded may be 10. According to various embodiments, the type and size of the preload process corresponding to the application to be preloaded may be different, and thus are not limited thereto.

According to an embodiment, the processor 510 may determine whether the capacity of the memory 520 for loading the preload process determined through the preload model 620 is insufficient. In an embodiment, the processor 510 may release (e.g., unload) the loading of the preload process having a long loading period from the preload processes loaded into the memory 520 through the preload model 620. Accordingly, the preload process corresponding to a designated application may be allocated to the secured storage space of the memory 520.

Figure 7:
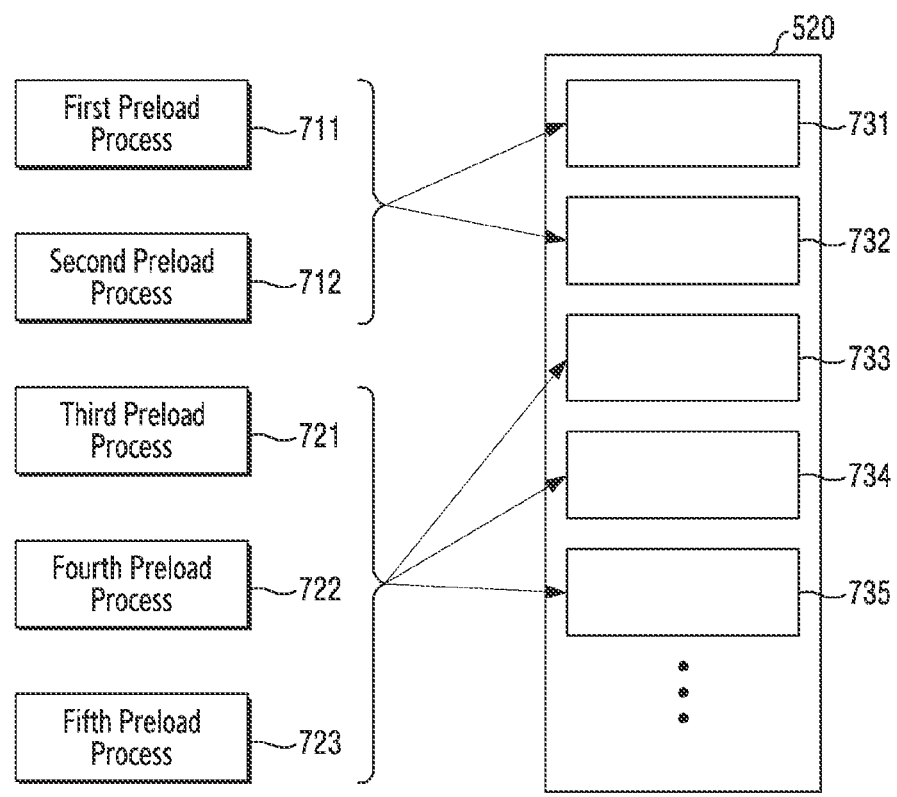
FIG. 7 is a diagram illustrating a method of loading a preload process into a memory of an electronic device according to an example embodiment.

FIG. 7 is a diagram illustrating a method of loading a preload process into a memory of an electronic device according to an embodiment.

Referring to FIG. 7, the processor 510 may determine at least one application to be preloaded and may load the preload process corresponding to the determined application to be preloaded into the memory 520. For example, the processor 510 may determine first to fifth applications to be preloaded, and may load the corresponding first to fifth preload processes 711 to 723 into the nonvolatile memory area of the memory 520.

According to an embodiment, the memory 520 may include a storage space capable of loading the preload process. The processor 510 may confirm the storage space of the memory 520 and determine a location where the preload process is stored. For example, the storage space of the memory 520 may be divided into various units according to the type of the memory 520 through a physical address, and the processor 510 may determine the location where the preload processor is stored through a logical address corresponding to the physical address. According to an embodiment, the memory 520 may load a plurality of preload processes corresponding to the plurality of applications to be preloaded, and may load each of the preload processes into the divided storage space. For example, the first to fifth preload processes 711 to 723 may be loaded into first to fifth memory areas 731 to 735, respectively.

According to an embodiment, the processor 510 may divide the first to fifth preload processes 711 to 723 into at least one operation and load the at least one operation into the memory 520. For example, the processor 510 may divide and configure the first to fifth preload processes 711 to 723 into the first preload process 711 and the second preload process 712, and the third to fifth preload processes 721 to 723 as first operation and second operation. According to various embodiments, at least one operation may vary. For example, the processor 510 may divide all the preload processes and load the divided preload processes into the memory 520 for each operation. Alternatively, the processor 510 may load all the preload processes corresponding to the application to be preloaded into the memory 520 at once without dividing them.

According to an embodiment, the processor 510 may load the preload processes divided into the at least one operation into the memory 520 for each operation at an interval of a predetermined reference time. For example, the first preload process 711 and the second preload process 712 corresponding to operation 1 may be loaded into the memory 520, and after the predetermined reference time elapses, the third to fifth preload processes 721 to 723 may be loaded into the memory 520.

According to an embodiment, the processor 510 may determine the order in which the preload processes are loaded into the memory based on the size of the display area or the execution history of the determined application to be preloaded. According to an embodiment, the processor 510 may determine the loading order of the preload process by using at least one of driving information on each of the plurality of applications to be preloaded, information on the number of executions, information on the number of notifications for the application, or the order according to the recent usage of the applications, through the preload model 620. For example, when the number of executions of the first application to be preloaded and the second application to be preloaded respectively corresponding to the first preload process 711 and the second preload process 712 is high immediately after the size of the display area is changed, the first and second preload processes may be loaded into the memory 520 with higher priority than the third to fifth preload processes 721 to 723.

Figure 8A:
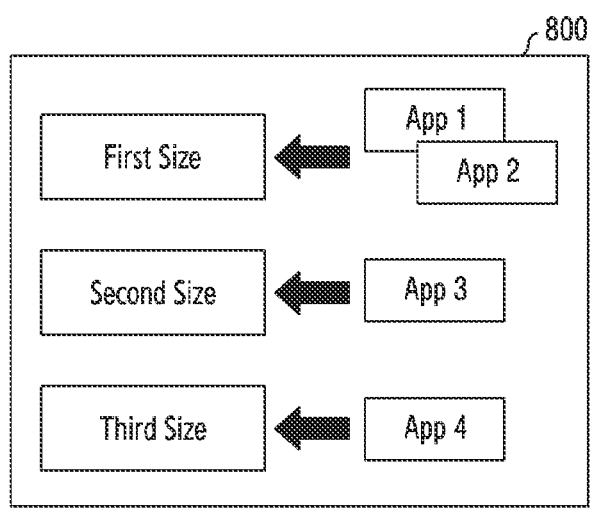
FIG. 8A is a diagram illustrating a preload model of an electronic device according to an example embodiment.
Figure 8B:
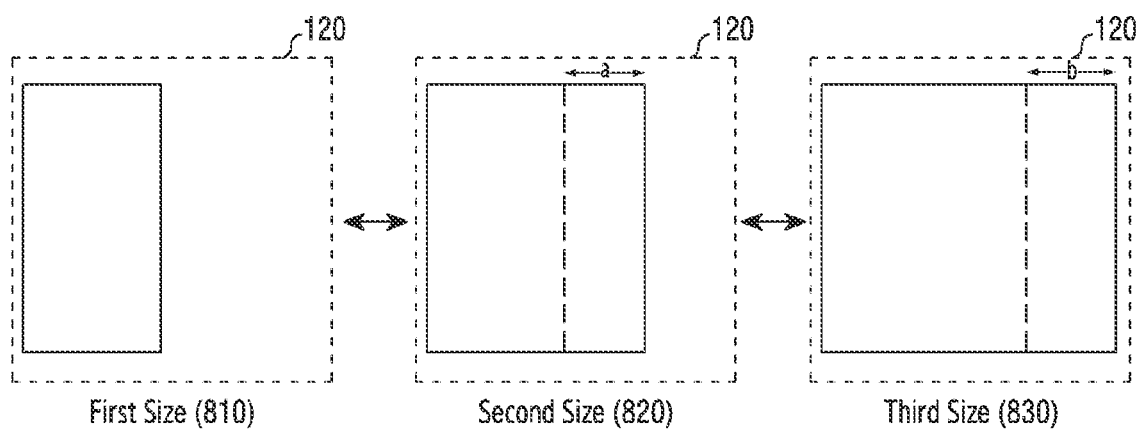
FIG. 8B is a diagram illustrating size levels of display areas classified through a preload model of an electronic device according to an example embodiment.

FIG. 8A is a diagram illustrating a preload model of an electronic device according to an embodiment. FIG. 8B is a diagram illustrating size levels of display areas classified through a preload model of an electronic device according to an embodiment.

Referring to FIG. 8B, the processor 510 may designate a size level of at least one display area and determine the size level of the display area based on the size level of the designated display area. For example, the processor 510 may classify the size of the display area where the screen is displayed on the flexible display 120 into a first size 810, a second size 820, or a third size 830. Referring to FIG. 8A, a preload model 800 (e.g., the preload model 620 of FIG. 6) may manage a plurality of applications to be preloaded based on the designated size level of the display area. For example, the preload model 800 may manage the plurality of applications to be preloaded in a list form in association with the size level of the display area. For example, the preload model 800 may store a plurality of applications to be preloaded in the memory 520 in association with the size level of the display area.

According to an embodiment, the processor 510 may previously configure criteria for determining the size level of the display area based on a distance (e.g., the size of the expanded display area) in which the second housing 112 moves relative to the first housing 111. According to various embodiments, the processor 510 may determine the size level of the display area through various criteria. For example, the processor 510 may designate the size level of the display area based on a horizontal to vertical ratio of the size of the display area, a horizontal size, an area of the display area, and/or a horizontal and vertical diagonal length. According to an embodiment, the first size 810 may indicate the size level of the display area that is basically displayed without the movement of the second housing 112 relative to the first housing 111. For example, the processor 510 may designate the size of the display area as the first size 810 in a state in which an area displaying the screen of the flexible display is not expanded and/or reduced. In an embodiment, compared to the first size 810, the second size 820 may indicate the size level of the display area of which width is expanded by a predetermined length a. For example, the processor 510 may designate the size of the display area including the expanded display area by moving the second housing 112 by a relative to the first housing 111, as the second size 820. In an embodiment, the third size 830 may indicate the size level of the display area of which width is expanded by a predetermined length b compared to the second size 820. For example, the processor 510 may designate the size of the display area including the expanded display area by moving the second housing 112 relative to the first housing 111 by a+b, as a third size 830.

According to an embodiment, the processor 510 may determine the size level corresponding to the size of the display area among the designated size levels, and determine the application to be preloaded based on the determined size level. For example, the processor 510 may identify a change in the size of the display area and determine that the size level corresponding to the changed size of the display area is the second size 820. Accordingly, the processor 510 may determine the application to be preloaded corresponding to the second size 820 through the preload model 800, and load a preload process corresponding to the determined application to be preloaded into the memory 520.

According to an embodiment, the preload model 800 may manage a plurality of applications to be preloaded based on the designated size level of the display area. For example, the preload model 800 may manage the plurality of applications to be preloaded based on the first to third sizes 810 to 830. According to an embodiment, the preload model 800 may determine the applications to be preloaded from among the plurality of applications stored in the memory 520. In this case, the preload model 800 may classify the applications to be preloaded based on the first to third sizes 810 to 830. For example, the size level of the display area where the applications to be preloaded are executed may be determined, and may be classified according to the size level of the display area in which each of the applications to be preloaded is executed among the first to third size 810 to 830. According to an embodiment, the preload model 800 may use the above-described application execution information to classify the applications to be preloaded based on the first to third sizes 810 to 830.

According to an embodiment, the preload model 800 may include first to third lists respectively corresponding to the size level (e.g., the first to third sizes 810 to 830) of the display area designated by the processor 510. The first to third lists may each include application information to be preloaded at the size level of the display area.

According to an embodiment, the preload model 800 may update an application related to the size level of the display area based on execution information of the application described with reference to FIG. 6. For example, the preload model 800 may update information on the applications to be preloaded included in the list corresponding to each designated size level of the display area based on the application execution information.

According to an embodiment, the preload model 800 may update the application related to the size level of the display area through machine learning. According to an embodiment, the preload model 800 may train an association pattern between an execution history of at least one application during a certain period and an execution history during a certain period after the above period based on big data information related to the application usage history. In this regard, the preload model 800 may include a neural network model composed of a recent network of a fully connected layer system and a week network that trains week and hour patterns. According to an embodiment, the preload model 800 may determine an application that has been frequently executed for a certain period to be the application to be preloaded based on the size of the display area.

According to another embodiment, the processor 510 may include a micro controller unit. In this case, the processor 510 may perform similar inferences for the application to be preloaded using a machine learning algorithm. For example, the processor 510 may input the history of at least one application that has been executed during a first period according to the size of the display area into the aforementioned machine learning algorithm, and generate a priority list based on the application having a large number of executions that are predicted for each of multiple time intervals within a second period output from the machine learning algorithm. According to various embodiments, the operation of updating the first to third lists by the preload model 800 may be performed by a neural network processor included in the processor 510, an operation module capable of high-speed parallel operations, and at least two combinations thereof.

Figure 9A:
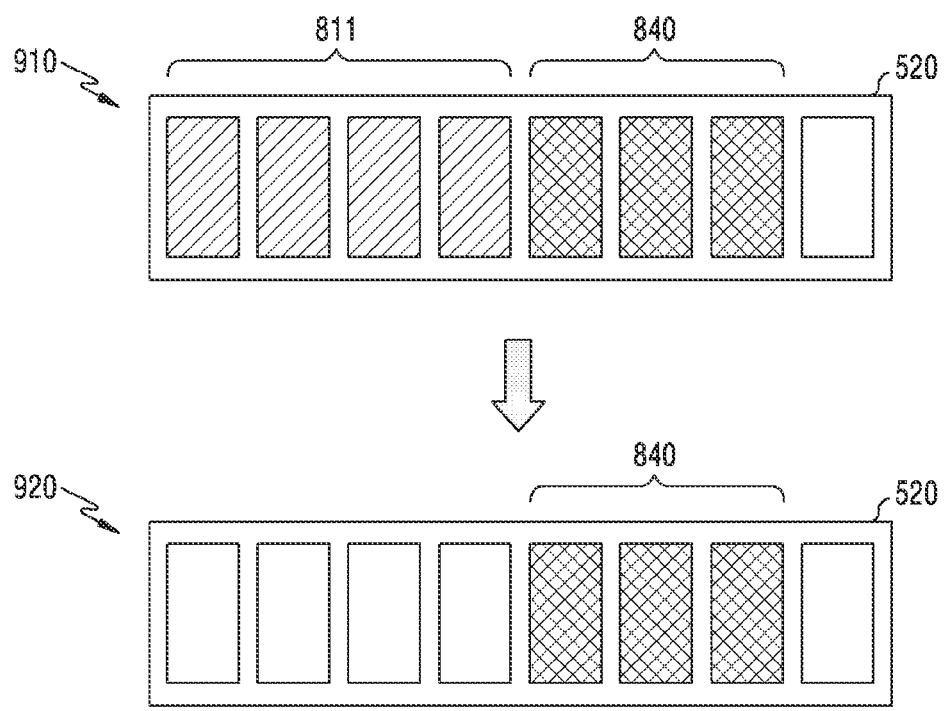
FIG. 9A is a diagram illustrating a method of unloading a preload process loaded into a memory of an electronic device according to an example embodiment.
Figure 9B:
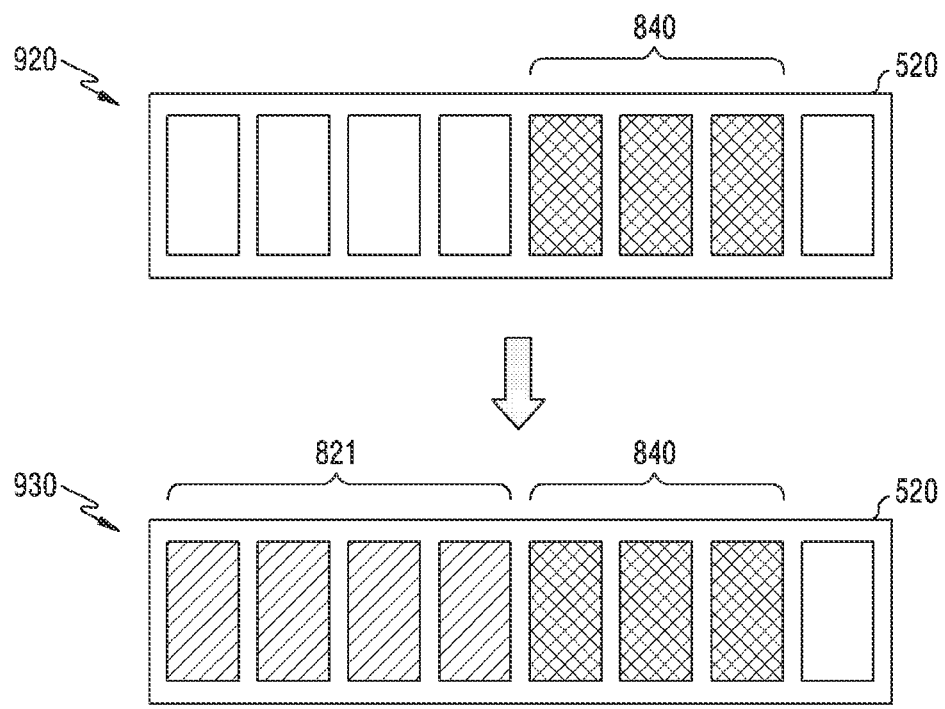
FIG. 9B is a diagram illustrating a method of loading a preload process into a memory of an electronic device according to an example embodiment.

FIG. 9A is a diagram illustrating a method of unloading a preload process loaded into a memory of an electronic device according to an embodiment. FIG. 9B is a diagram illustrating a method of loading a preload process into a memory of an electronic device according to an embodiment.

Referring to FIGS. 9A and 9B, as the size level of the display area is changed from the first size 810 to the second size 820, an operation of changing the preload process of the loaded into the memory 520 is shown. According to an embodiment, the processor 510 may identify that the size of the display area is changed and determine the application to be preloaded from among a plurality of applications based on the identified size of the display area. In addition, the preload process for executing the determined application to be preloaded may be loaded into the memory 520. For example, the processor 510 may identify that the size level of the display area is changed from the first size 810 to the second size 820.

According to an embodiment, the memory 520 may be in a first memory state 910 when the size level of the display area is the first size 810. For example, when the size level of the display area is the first size 810, the memory 520, which is in the first memory state 910, may store a first preload process 811 corresponding to a first size application executed in the electronic device 100. In addition, when the memory is in the first memory state 910, the memory 520 may store a basic preload process 840 corresponding to a basic application that basically needs to be executed regardless of the size level of the display area.

According to an embodiment, the processor 510 may determine the preload process corresponding to an application to be unloaded from among the preload processes loaded into the memory 520, to be an unload process, based on the changed size of the display area. In addition, the processor 510 may unload the determined unload process from the memory 520.

According to an embodiment, the processor 510 may identify that the size level of the display area is changed from the first size 810 to the second size 820, and determine the first size application to be the application to be unloaded using the preload model 620. In addition, the first preload process 811 corresponding to the first size application may be determined to be the preload process to be unloaded, and the first preload process 811 may be unloaded. According to an embodiment, the unloaded preload process may correspond to a preload process corresponding to an application that is not executed in the changed size of the display area. For example, as the size level of the display area is changed from the first size 810 to the second size 820, a first application that is not executed in the second size 820 may be determined to be the application to be unloaded, and the first preload process 811 may be unloaded.

According to an embodiment, the memory 520 may be in a second memory state 920 when the size level of the display area is changed from the first size 810 to the second size 820. According to an embodiment, the memory 520 in the second state 920 may be in a state in which the first preload process 811 executed in the electronic device 100 is unloaded when the size level of the display area is the first size 810. In an embodiment, the processor 510 may not unload the basic preload process 840, which is executed regardless of the size level of the display area, from the memory 520 even if the size level of the display area is changed.

According to an embodiment, the unloading of the preload process loaded into the memory 520 by the processor 510 may occur based on the size of the available space of the memory 520.

According to an embodiment, the processor 510 may unload the preload process loaded into the memory 520 based on the change in the size of the display area, and load the preload process based on the changed size of the display area into the memory 520. For example, the processor 510 may unload the first preload process 811 from the memory 520 based on the change in the size level from the first size 810 to the second size 820. In addition, the processor 510 may load a second preload process 821 corresponding to a second size application executed in the electronic device 100 when the size level of the display area is the second size 820, into the memory 520 through the preload model 620. According to an embodiment, when the second preload process 821 is stored in the memory 520, the memory 520 may be expressed as a third memory state 930. For example, when the state of the memory 520 is the third memory state 930, the memory 520 may store the second preload process 821 and the basic preload process 840 corresponding to the second size application.

For convenience of description, the case where the size level of the display area is changed from the first size 810 to the second size 820 has been described, but is not limited thereto. In addition, the types of applications corresponding to each size level of the display area may be more diverse.

Figure 10:
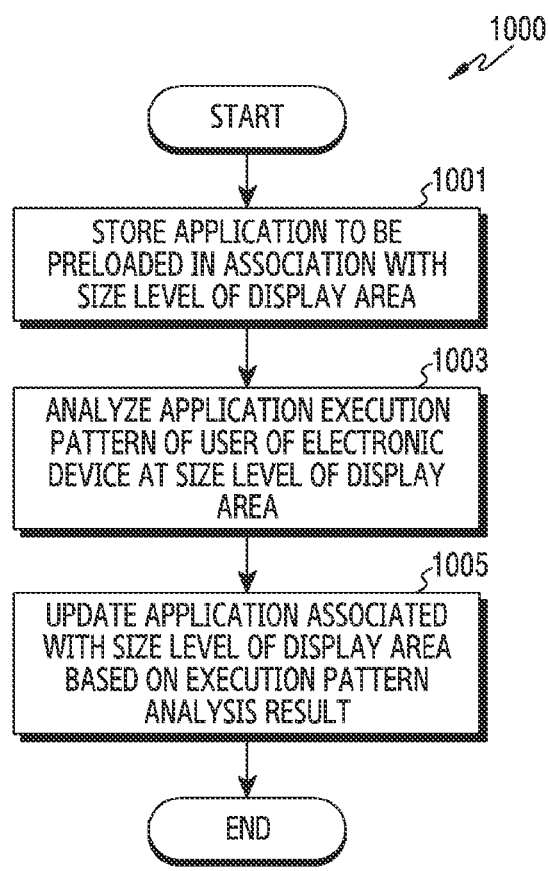
FIG. 10 is a flowchart illustrating an operation of updating an application to be preloaded in a preload model of an electronic device according to an example embodiment.

FIG. 10 is a flowchart illustrating an operation 1000 of updating an application to be preloaded in a preload model of an electronic device according to an embodiment.

Referring to FIG. 10, according to an embodiment, in operation 1001, the electronic device 100 may store an application to be preloaded in association with a size level of a display area. For example, the preload model 620 of the electronic device 100 may store at least one application to be preloaded among a plurality of applications stored in a partial area of the memory 520 in an area other than the partial area of the memory in association with the size level of the display area. According to an embodiment, the size level of the display area may be configured through the processor 510. For example, referring to FIGS. 8A and 8B, the size level of the display area may be configured as the size levels (the first size 810, the second size 820, and the third size 830) of the display area.

According to an embodiment, the electronic device 100 may include a list corresponding to the size level of each display area in order to store the application to be preloaded in association with the size level of the display area. For example, the preload model 620 of the electronic device 100 may store the application to be preloaded in the lists corresponding to respective size levels of at least one display area.

According to an embodiment, in operation 1003, the electronic device 100 may analyze a user's application execution pattern of the electronic device 100 at the size level of the display area. For example, the processor 510 of the electronic device 100 may designate the size level of the at least one display area and analyze a pattern of an application executed at the designated size level of the display area. According to an embodiment, the analyzing of the execution pattern may be an operation of training an association pattern between an execution history of at least one application during a certain period and an execution history during a certain period after the above certain period based on big data information related to the application usage history.

According to an embodiment, in operation 1005, the electronic device 100 may update an application related to the size level of the display area based on the execution pattern analysis result. For example, the processor 510 of the electronic device 100 may analyze the type of the application executed in the electronic device 100 according to the size level of the display area. Based on the analysis result, the processor 510 may update the application stored in association with the size level of the display area. In an embodiment, the processor 510 may update lists corresponding to the size level of each display area included in the preload model 620. Accordingly, the applications to be preloaded stored in the lists corresponding to the respective size levels of the at least one display area may be changed.

According to various embodiments, the application to be preloaded stored in association with the size level of the display area may be updated through various methods. For example, the updating of the application to be preloaded may be executed through machine learning. For example, the electronic device 100 may include the size of the display area and execution pattern as feature information, and may train training data including identification information of the application that has been executed according to the size of the display area and the execution pattern as labeling data of the feature information. The electronic device may generate or update a preload model that predicts an application to be executed based on the execution pattern and the size of the display area based on the training result.

Figure 11:
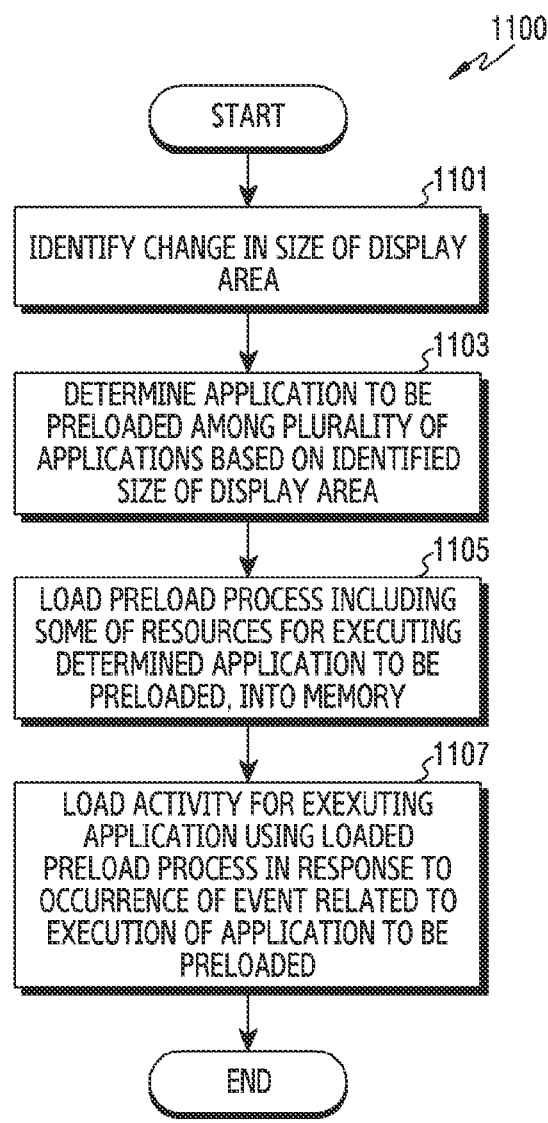
FIG. 11 is a flowchart illustrating an operation of loading a preload process into a memory based on a change in the size of a display area of an electronic device according to an example embodiment.

FIG. 11 is a flowchart illustrating an operation 1100 of loading a preload process into a memory based on a change in the size of a display area of an electronic device according to an embodiment.

According to an embodiment, in operation 1101, the processor 510 may identify a change in the size of the display area. For example, as the second housing 112 moves relative to the first housing 111, it may be identified that the size of the display area indicating the size of an area displaying the screen of the flexible display 120 is expanded and/or reduced. According to various embodiments, the change in size of the display area may occur when a user of the electronic device 100 manually adjusts the size of the display area or when the processor 510 controls a motor of the rotating structure 140.

According to an embodiment, in operation 1103, the processor 510 may determine the application to be preloaded from among a plurality of applications based on the identified size of the display area. For example, the processor 510 may determine an application that is highly likely to be executed in the size of the display area to be the application to be preloaded, based on the identified size of the display area. According to an embodiment, the processor 510 may determine the application to be preloaded through the preload model 620.

According to an embodiment, in operation 1105, the processor 510 may load a preload process including some of resources for executing the determined application to be preloaded into the memory 520. For example, the processor 510 may determine at least one application to be preloaded and store at least one preload process corresponding to the respective applications to be preloaded into the nonvolatile memory area of the memory 520.

According to an embodiment, the processor 510 may divide the at least one preload process corresponding to each of the at least one application into at least one operation and load the divided result into the memory 520. According to various embodiments, the processor 510 may divide the at least one preload process into the at least one operation through various methods. For example, the processor 510 may preferentially load, into the memory 520, a preload process that is likely to be executed at the identified size of the display area through the preload model 620, compared to other preload processes.

In operation 1107, the processor 510 according to an embodiment may load an activity for execution of an application by using the loaded preload process in response to the occurrence of an event associated with the execution of the application to be preloaded. For example, the processor 510 may receive the occurrence of the event associated with the execution of the application to be preloaded, and in response to the reception, may load the activity for the execution of the application by using the preload process corresponding to the application to be preloaded which is executed among the at least one preload process loaded into the memory 520. For example, in operation 1107, using the preload process loaded in response to the occurrence of the event associated with the execution of the application to be preloaded, generating the screen of the application for executing the application may be included.

Figure 12:
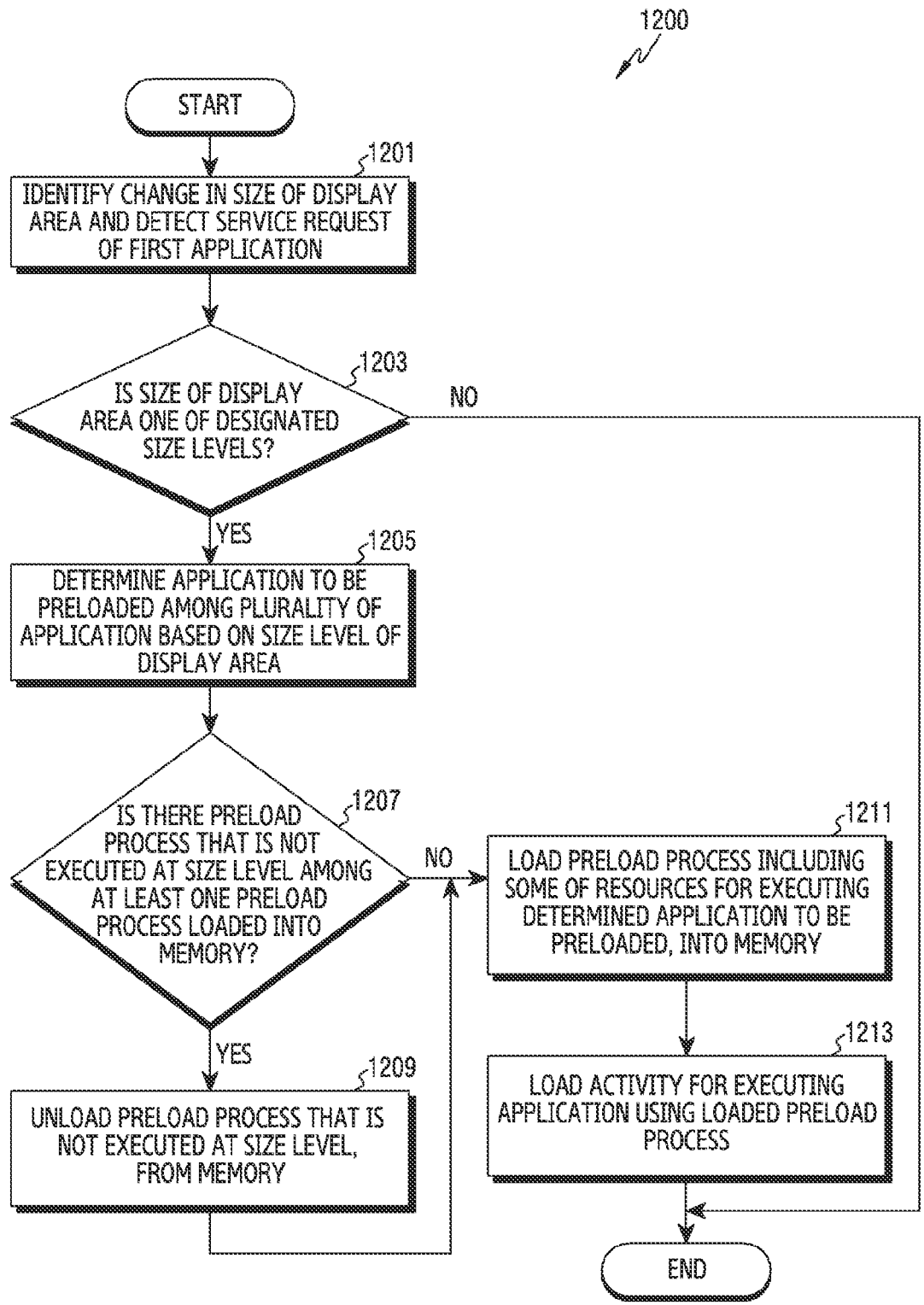
FIG. 12 is a flowchart illustrating an operation of loading a preload process into a memory based on a size level of a display area of an electronic device according to an example embodiment.

FIG. 12 is a flowchart illustrating an operation 1200 of loading a preload process into a memory based on a size level of a display area of an electronic device according to an embodiment.

According to an embodiment, in operation 1201, the processor 510 may identify a change in the size of the display area. According to an embodiment, in operation 1203, the processor 510 may determine whether the size of the display area is one of designated size levels. According to an embodiment, the processor 510 may classify the type of the size of the display area and designate size levels corresponding to each type. For example, the processor 510 may designate size levels based on a horizontal and vertical ratios of the display area.

According to an embodiment, in operation 1203, the processor 510 may determine whether the size of the display area is one of the designated size levels. For example, the processor 510 may determine whether the changed size of the display area corresponds to one of the designated size levels. Based on the determination result, the processor 510 may determine the size level corresponding to the size of the display area.

According to various embodiments, the processor 510 may designate various size levels. According to an embodiment, the processor 510 may not perform a preload operation when the size of the display area does not correspond to one of the designated size levels.

According to an embodiment, in operation 1205, the processor 510 may determine the application to be preloaded from among a plurality of applications based on the size level of the display area. According to an embodiment, the processor 510 may determine at least one application to be preloaded based on the determined size level through the preload model 620. For example, the processor 510 may determine the at least one application to be preloaded using at least one application to be preloaded that is managed based on the size levels of the display area in the preload model 620.

According to an embodiment, in operation 1207, the processor 510 may determine whether there is a preload process that is not executed at the determined size level among at least one preload process loaded into the memory 520. For example, the processor 510 may determine whether there is a preload process corresponding to an application that is not executed at the determined size level, among at least one preload process loaded into the nonvolatile area of the memory 520. According to an embodiment, the processor 510 may perform operation 1211 when there is no preload process that is not executed at the determined size level among the at least one preload process loaded into the memory 520.

When there is the preload process that is not executed at the determined size level among the at least one preload process loaded into the memory 520, in operation 1209, the processor 510 according to an embodiment may unload the preload process that is not executed at the determined size level from the memory 520. For example, it may be assumed that the size level is changed from the first size 810 to the second size 820. At this time, when there is a preload process corresponding to an application that is executed only when the size of the display area is the first size 810 among the preload processes loaded into the memory 520, the processor 510 may unload the preload process from the memory 520.

According to an embodiment, in operation 1211, the processor 510 may load a preload process including some of resources for executing the determined application to be preloaded into the memory 520. For example, the processor 510 may load the at least one preload process corresponding to at least one application to be preloaded determined based on the size level of the display area, into the nonvolatile area of the memory 520. According to an embodiment, as in operation 1105 described with reference to FIG. 11, the processor 510 may divide the at least one process for each operation and load the at least one process into the memory 520.

In operation 1213, the processor 510 according to an embodiment may load an activity for executing an application by using the loaded preload process. For example, the processor 510 may input the occurrence of an event associated with the execution of one application among the at least one application corresponding to the at least one preload process loaded into the memory 520. In this case, the processor 510 may load the activity for executing the application by using the preload process loaded into the memory 520 corresponding to the one application in response to the occurrence of the event. For example, when an event occurs in association with the execution of the application to be preloaded, the processor 510 may omit at least one operation required for the execution (or entry) of the application by using the preload process loaded into the memory 520 and may execute the application. Accordingly, the application execution speed of the electronic device 100 according to the disclosure may be improved.

Figure 13:
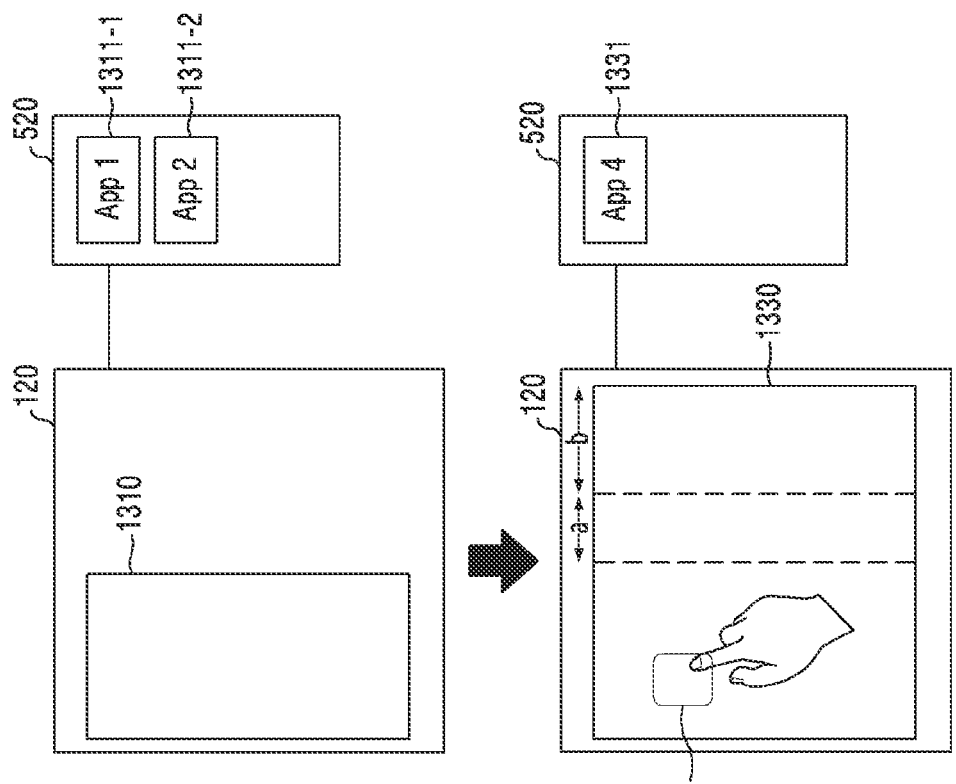
FIG. 13 is a diagram illustrating execution of an application corresponding to a preload process of an electronic device according to an embodiment.
Figure 13:
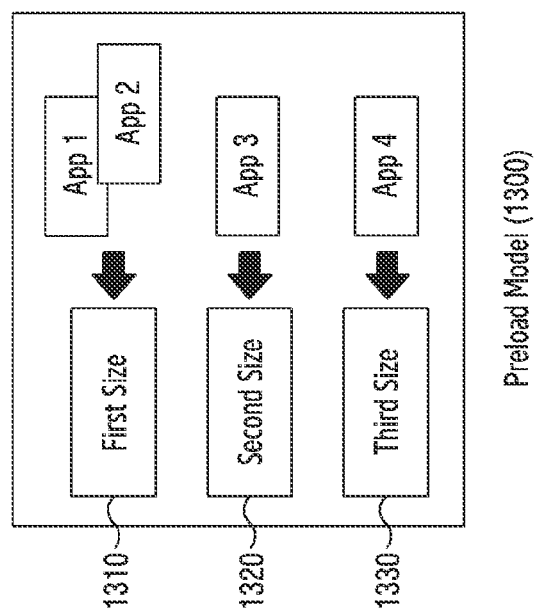

FIG. 13 is a diagram illustrating execution of an application corresponding to a preload process of an electronic device according to an embodiment.

According to an embodiment, a preload model 1300 (e.g., the preload model 800) may store an application to be preloaded in association with each size level, based on the size level of at least one display area designated through the processor 510. In an embodiment, the preload model 1300 may manage the application to be preloaded using a list corresponding to each size level. For example, through the processor 510, the preload model 1300 may designate the size levels of the display area as a first size 1310, a second size 1320, and a third size 1330. In addition, the preload model 1300 may store the application to be preloaded in association with the first size 1310. For example, the preload model 1300 may store a first application App 1 and a second application App 2 which are executed at the first size 1310 in the memory 520, in association with the first size 1310. Similarly, the preload model 1300 may store a third application App 3 that is executed at the second size 1320 in the memory 520 in association with the second size 1320. In addition, the preload model 1300 may store a fourth application App 4 that is executed at the third size 1330 in the memory 520 in association with the third size 1330.

According to an embodiment, in response to the size level of the display area being the first size 1310, the memory 520 may store a first preload process 1311_1 corresponding to the first application App 1 and a second preload process 1311_2 corresponding to the second application App 2 through the preload model 1300. According to an embodiment, each of the first preload process 1311_1 and the second preload process 1311_2 may include some of resources for executing the first application App 1 and the second application App 2.

According to an embodiment, the processor 510 may identify that the size level of the display area is changed from the first size 1310 to the third size 1330. In an embodiment, based on the fact that the size level of the display area is changed from the first size 1310 to the third size 1330, the processor 510 may unload some preload processes included in the memory 520 and load the preload process corresponding to the third size 1330. For example, the processor 510 may unload the first preload process 1311_1 and the second preload process 1311_2 which area loaded into the memory 520. In addition, the processor 510 may load a fourth preload process 1331 corresponding to a fourth application APP 4 into the memory 520 through the preload model 1300. For example, when the size level of the display area is the third size 1330, the processor 510 may load, into the memory 520, the fourth preload process 1331 corresponding to the fourth application App 4 that is likely to be executed in the electronic device 100.

According to an embodiment, the processor 510 may execute an application using a preload process corresponding to the application loaded into the memory 520 in response to an application execution event input of one of at least one application to be preloaded. For example, the processor 510 may receive a user's touch input to a fourth application icon 1332 of the electronic device 100 and receive an execution event input of the fourth application App 4. In an embodiment, the processor 510 may use the fourth preload process 1331 loaded into the memory 520 to execute the fourth application App 4.

According to various embodiments, the application execution event input may vary. For example, the application execution event input may include at least one of an event of receiving an input related to execution of the application to be preloaded from the user of the electronic device 100, an event of detecting that the size level of the display area is changed to a designated size level, or an event of receiving a notification from the application to be preloaded.

Figure 14:
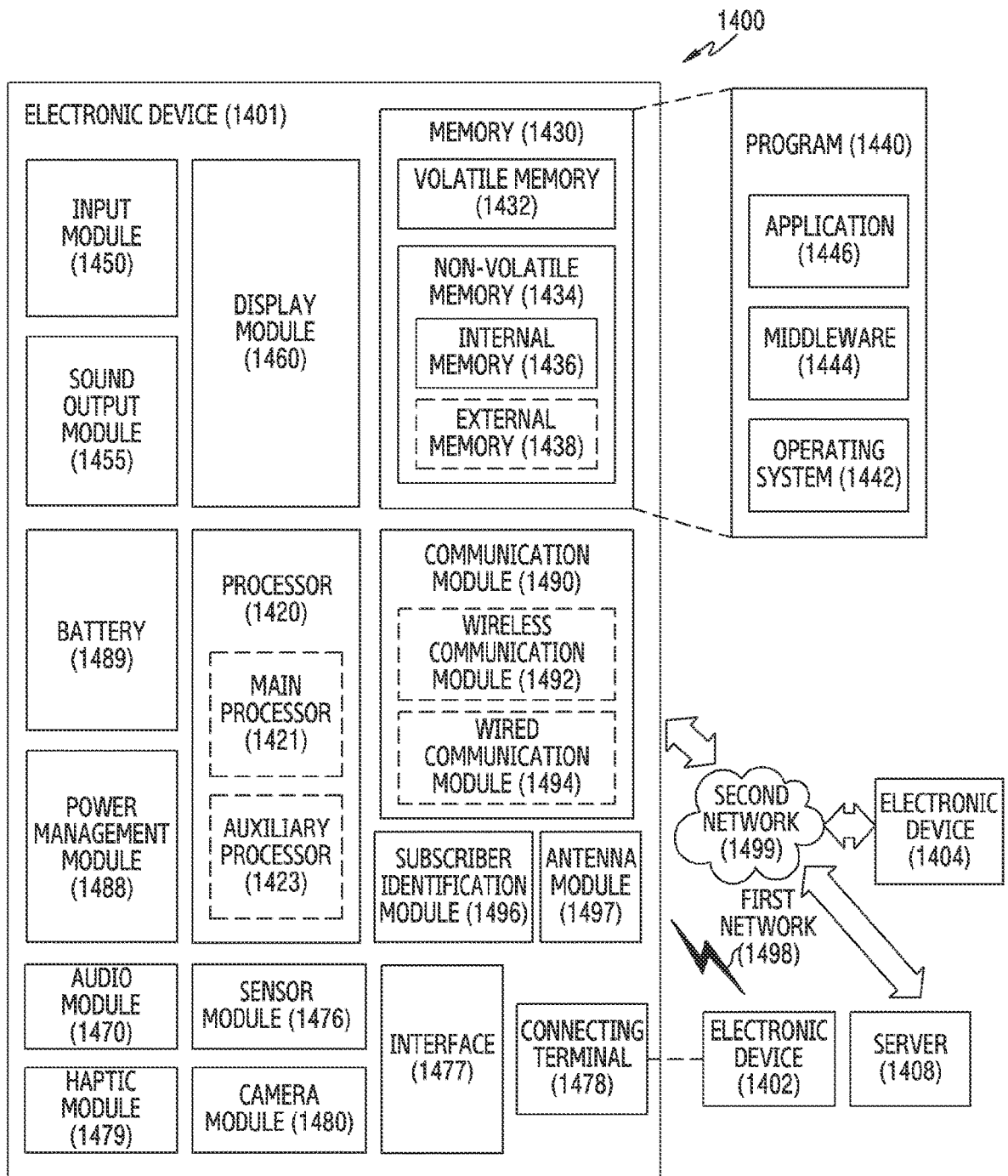
FIG. 14 is a block diagram illustrating an electronic device in a network environment according to various example embodiments.

FIG. 14 is a block diagram illustrating an electronic device 1401 in a network environment 1400 according to various embodiments.

Referring to FIG. 14, the electronic device 1401 in the network environment 1400 may communicate with an electronic device 1402 via a first network 1498 (e.g., a short-range wireless communication network), or an electronic device 1404 or a server 1408 via a second network 1499 (e.g., a long-range wireless communication network). According to an embodiment, the electronic device 1401 may communicate with the electronic device 1404 via the server 1408. According to an embodiment, the electronic device 1401 may include a processor 1420, memory 1430, an input module 1450, a sound output module 1455, a display module 1460, an audio module 1470, a sensor module 1476, an interface 1477, a connecting terminal 1478, a haptic module 1479, a camera module 1480, a power management module 1488, a battery 1489, a communication module 1490, a subscriber identification module (SIM) 1496, or an antenna module 1497. In some embodiments, at least one of the components (e.g., the connecting terminal 1478) may be omitted from the electronic device 1401, or one or more other components may be added in the electronic device 1401. In some embodiments, some of the components (e.g., the sensor module 1476, the camera module 1480, or the antenna module 1497) may be implemented as a single component (e.g., the display module 1460).

The processor 1420 may execute, for example, software (e.g., a program 1440) to control at least one other component (e.g., a hardware or software component) of the electronic device 1401 coupled, directly or indirectly, with the processor 1420, and may perform various data processing or computation. According to an embodiment, as at least part of the data processing or computation, the processor 1420 may store a command or data received from another component (e.g., the sensor module 1476 comprising at least one sensor, and/or the communication module 1490 comprising communication circuitry) in volatile memory 1432, process the command or the data stored in the volatile memory 1432, and store resulting data in non-volatile memory 1434. According to an embodiment, the processor 1420 may include a main processor 1421 (e.g., a central processing unit (CPU) or an application processor (AP)), or an auxiliary processor 1423 (e.g., a graphics processing unit (GPU), a neural processing unit (NPU), an image signal processor (ISP), a sensor hub processor, or a communication processor (CP)) that is operable independently from, or in conjunction with, the main processor 1421. For example, when the electronic device 1401 includes the main processor 1421 and the auxiliary processor 1423, the auxiliary processor 1423 may be adapted to consume less power than the main processor 1421, or to be specific to a specified function. The auxiliary processor 1423 may be implemented as separate from, or as part of the main processor 1421.

The auxiliary processor 1423 may control at least some of functions or states related to at least one component (e.g., the display module 1460, the sensor module 1476, or the communication module 1490) among the components of the electronic device 1401, instead of the main processor 1421 while the main processor 1421 is in an inactive (e.g., sleep) state, or together with the main processor 1421 while the main processor 1421 is in an active state (e.g., executing an application). According to an embodiment, the auxiliary processor 1423 (e.g., an image signal processor or a communication processor) may be implemented as part of another component (e.g., the camera module 1480 or the communication module 1490) functionally related to the auxiliary processor 1423. According to an embodiment, the auxiliary processor 1423 (e.g., the neural processing unit) may include a hardware structure specified for artificial intelligence model processing. An artificial intelligence model may be generated by machine learning. Such learning may be performed, e.g., by the electronic device 1401 where the artificial intelligence is performed or via a separate server (e.g., the server 1408). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure. Each AI network and/or element herein may be trained.

The memory 1430 may store various data used by at least one component (e.g., the processor 1420 or the sensor module 1476) of the electronic device 1401. The various data may include, for example, software (e.g., the program 1440) and input data or output data for a command related thereto. The memory 1430 may include the volatile memory 1432 or the non-volatile memory 1434.

The program 1440 may be stored in the memory 1430 as software, and may include, for example, an operating system (OS) 1442, middleware 1444, or an application 1446.

The input module 1450 may receive a command or data to be used by another component (e.g., the processor 1420) of the electronic device 1401, from the outside (e.g., a user) of the electronic device 1401. The input module 1450 may include, for example, a microphone, a mouse, a keyboard, a key (e.g., a button), or a digital pen (e.g., a stylus pen).

The sound output module 1455 may output sound signals to the outside of the electronic device 1401. The sound output module 1455 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 1460 may visually provide information to the outside (e.g., a user) of the electronic device 1401. The display module 1460 may include, for example, a display, a hologram device, or a projector and control circuitry to control a corresponding one of the display, hologram device, and projector. According to an embodiment, the display module 1460 may include a touch sensor adapted to detect a touch, or a pressure sensor adapted to measure the intensity of force incurred by the touch.

The audio module 1470 may convert a sound into an electrical signal and vice versa. According to an embodiment, the audio module 1470 may obtain the sound via the input module 1450, or output the sound via the sound output module 1455 or a headphone of an external electronic device (e.g., an electronic device 1402) directly (e.g., wiredly) or wirelessly coupled with the electronic device 1401.

The sensor module 1476 may detect an operational state (e.g., power or temperature) of the electronic device 1401 or an environmental state (e.g., a state of a user) external to the electronic device 1401, and then generate an electrical signal or data value corresponding to the detected state. According to an embodiment, the sensor module 1476 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1477 may support one or more specified protocols to be used for the electronic device 1401 to be coupled with the external electronic device (e.g., the electronic device 1402) directly (e.g., wiredly) or wirelessly. According to an embodiment, the interface 1477 may include, for example, a high definition multimedia interface (HDMI), a universal serial bus (USB) interface, a secure digital (SD) card interface, or an audio interface.

A connecting terminal 1478 may include a connector via which the electronic device 1401 may be physically connected, directly or indirectly, with the external electronic device (e.g., the electronic device 1402). According to an embodiment, the connecting terminal 1478 may include, for example, a HDMI connector, a USB connector, a SD card connector, or an audio connector (e.g., a headphone connector).

The haptic module 1479 may convert an electrical signal into a mechanical stimulus (e.g., a vibration or a movement) or electrical stimulus which may be recognized by a user via his tactile sensation or kinesthetic sensation. According to an embodiment, the haptic module 1479 may include, for example, a motor, a piezoelectric element, or an electric stimulator.

The camera module 1480 may capture a still image or moving images. According to an embodiment, the camera module 1480 may include one or more lenses, image sensors, image signal processors, or flashes.

The power management module 1488 may manage power supplied to the electronic device 1401. According to an embodiment, the power management module 1488 may be implemented as at least part of, for example, a power management integrated circuit (PMIC).

The battery 1489 may supply power to at least one component of the electronic device 1401. According to an embodiment, the battery 1489 may include, for example, a primary cell which is not rechargeable, a secondary cell which is rechargeable, or a fuel cell.

The communication module 1490, comprising communication circuitry, may support establishing a direct (e.g., wired) communication channel or a wireless communication channel between the electronic device 1401 and the external electronic device (e.g., the electronic device 1402, the electronic device 1404, or the server 1408) and performing communication via the established communication channel. The communication module 1490 may include one or more communication processors that are operable independently from the processor 1420 (e.g., the application processor (AP)) and supports a direct (e.g., wired) communication or a wireless communication. According to an embodiment, the communication module 1490 may include a wireless communication module 1492 comprising communication circuitry (e.g., a cellular communication module, a short-range wireless communication module, or a global navigation satellite system (GNSS) communication module) or a wired communication module 1494 (e.g., a local area network (LAN) communication module or a power line communication (PLC) module). A corresponding one of these communication modules may communicate with the external electronic device via the first network 1498 (e.g., a short-range communication network, such as Bluetooth™, wireless-fidelity (Wi-Fi) direct, or infrared data association (IrDA)) or the second network 1499 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 1492, comprising communication circuitry, may identify and authenticate the electronic device 1401 in a communication network, such as the first network 1498 or the second network 1499, using subscriber information (e.g., international mobile subscriber identity (IMSI)) stored in the subscriber identification module 1496.

The wireless communication module 1492 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 1492 may support a high-frequency band (e.g., the mmWave band) to achieve, e.g., a high data transmission rate. The wireless communication module 1492 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 1492 may support various requirements specified in the electronic device 1401, an external electronic device (e.g., the electronic device 1404), or a network system (e.g., the second network 1499). According to an embodiment, the wireless communication module 1492 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 1497 may transmit or receive a signal or power to or from the outside (e.g., the external electronic device) of the electronic device 1401. According to an embodiment, the antenna module 1497 may include an antenna including a radiating element composed of a conductive material or a conductive pattern formed in or on a substrate (e.g., a printed circuit board (PCB)). According to an embodiment, the antenna module 1497 may include a plurality of antennas (e.g., array antennas). In such a case, at least one antenna appropriate for a communication scheme used in the communication network, such as the first network 1498 or the second network 1499, may be selected, for example, by the communication module 1490 (e.g., the wireless communication module 1492) from the plurality of antennas. The signal or the power may then be transmitted or received between the communication module 1490 and the external electronic device via the selected at least one antenna. According to an embodiment, another component (e.g., a radio frequency integrated circuit (RFIC)) other than the radiating element may be additionally formed as part of the antenna module 1497.

According to various embodiments, the antenna module 1497 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 1401 and the external electronic device 1404 via the server 1408 coupled, directly or indirectly, with the second network 1499. Each of the electronic devices 1402 or 1404 may be a device of a same type as, or a different type, from the electronic device 1401. According to an embodiment, all or some of operations to be executed at the electronic device 1401 may be executed at one or more of the external electronic devices 1402, 1404, or 1408. For example, if the electronic device 1401 should perform a function or a service automatically, or in response to a request from a user or another device, the electronic device 1401, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 1401. The electronic device 1401 may provide the outcome, with or without further processing of the outcome, as at least part of a reply to the request. To that end, a cloud computing, distributed computing, mobile edge computing (MEC), or client-server computing technology may be used, for example. The electronic device 1401 may provide ultra low-latency services using, e.g., distributed computing or mobile edge computing. In another embodiment, the external electronic device 1404 may include an internet-of-things (IoT) device. The server 1408 may be an intelligent server using machine learning and/or a neural network. According to an embodiment, the external electronic device 1404 or the server 1408 may be included in the second network 1499. The electronic device 1401 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via at least a third element(s).

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC). Thus, each "module" herein may comprise circuitry.

Various embodiments as set forth herein may be implemented as software (e.g., the program 1440) including one or more instructions that are stored in a storage medium (e.g., internal memory 1436 or external memory 1438) that is readable by a machine (e.g., the electronic device 1401). For example, a processor (e.g., the processor 1420) of the machine (e.g., the electronic device 1401) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 15:
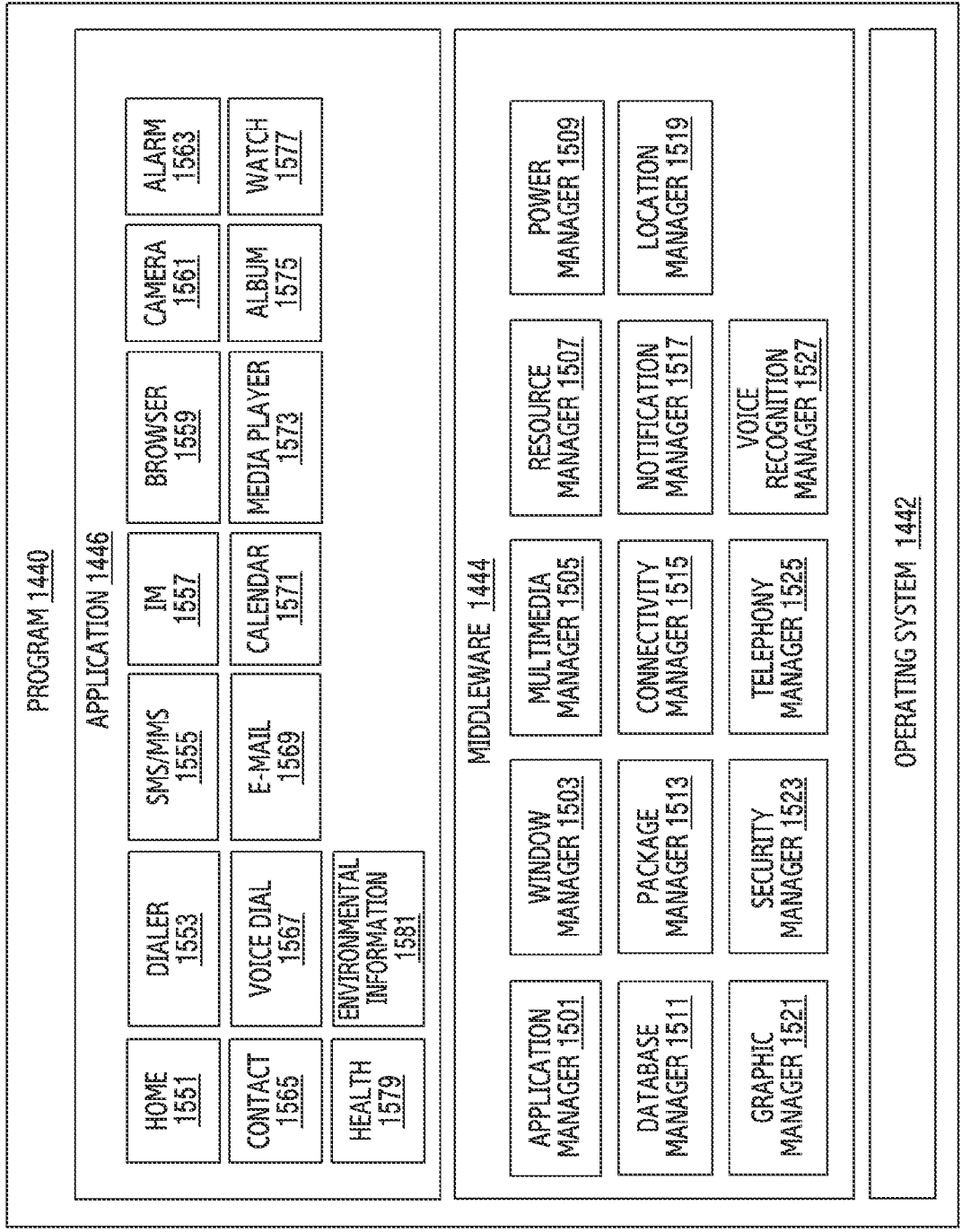
FIG. 15 illustrates an example of a configuration of an electronic device according to various example embodiments.

FIG. 15 illustrates an example of a configuration of an electronic device according to various embodiments.

FIG. 15 is a block diagram 1500 illustrating a program 1440 according to an embodiment. According to an embodiment, the program 1440 may include an operating system (OS) 1442 for controlling one or more resources of the electronic device 1401, a middleware 1444, or an application 1446 running on the OS. The operating system 1442 may be, for example, Android™, iOS™, Windows™, Symbian™, Tizen™, or Bada™. At least a part of the program 1440 may be preloaded on the electronic device 1401 or may be downloaded or updated from an external electronic device (e.g., the electronic device 1402 or 1404, or the server 1408).

The operating system 1442 may control a management (e.g., allocation, or retrieval) of one or more system resources (e.g., a process, a memory or a power). Additionally or alternatively, the operating system 1442 may include one or more driver programs to run another hardware device, for example, the input module 1450, the sound output module 1455, the display module 1460, the audio module 1470, the sensor module 1476, the interface 1477, the haptic module 1479, the camera module 1480, the power management module 1488, the battery 1489, the communication module 1490, the subscriber identification module 1496, or the antenna module 1497.

The middleware 1444, for example, may provide various functions to the application 1446 so that the application 1446 may use a function or information provided from one or more resources of the electronic device 1401. The middleware 1444 may include, for example, an application manager 1501, a window manager 1503, a multimedia manager 1505, a resource manager 1507, a power manager 1509, a database manager 1511, a package manager 1513, a connectivity manager 1515, a notification manager 1517, a location manager 1519, a graphic manager 1521, a security manager 1523, a telephony manager 1525, or a voice recognition manager 1527.

The application manager 1501 may mange, for example, a life cycle of the application 1446. The window manager 1503 may manage one or more GUI resources used in a screen. The multimedia manager 1505 may recognize one or more formats required for playing various media files and may encode or decode a media file using a codec matched to the format. The resource manager 1507 may manage a source code or the application 1446 or a storage space of the memory 1430. The power manager 1509, for example, may manage a capacity, a temperature or a power of the battery 1489, and may determine or provide information required for operating the electronic device 1401. According to an embodiment, the power manager 1509 may operate together with a basic input/output system (BIOS).

The database manager 1511 may generate, search, or modify a database to be used in the application 1446. The package manager 1513 may manage installation or update of an application distributed in a package file format. The connectivity manger 1515 may manage wireless connection or direct connection between the electronic device 1401 and an external electronic device. The notification manager 1517 may provide a function for notifying a designated event (e.g., an incoming call, a message, or an alarm) to a user. The location manager 1519 may manage location information of the electronic device 1401. The graphic manager 1521 may manage a graphic effect to be provided to a user or a user interface related thereto.

The security manager 1523 may provide various security functions required for system security or user authentication. The telephony manager 1525 may manage a voice or video call function of the electronic device 1401. The voice recognition manager 1527 may transmit voice data of a user to the server 1408 and may receive, from the server 1408, a command corresponding to a function to be performed in the electronic device 1401 based on at least a part of the voice data, or text data converted based on at least a part of the voice data. According to an embodiment, the middleware 1544 may delete a part of existing elements or may add new elements dynamically. According to an embodiment, at least a part of the middleware 1444 may be included in a part of the operating system 1442, or may be implemented by a software different from the operating system 1442.

The application 1446, for example, may include an application capable of performing functions such as a home 1551, a dialer 1553, an SMS/MMS 1555, an instant message (IM) 1557, a browser 1559, a camera 1561, an alarm 1563, a contact 1565, a voice recognition/dial 1567, an e-mail 1569, a calendar 1571, a media player 1573, an album 1575, a watch 1577, health 1579 (e.g., measure an exercise amount or blood sugar), or environmental information 1581 (e.g., provide air pressure, humidity, or temperature information). According to an embodiment, the application 1446 may include an information exchange application for supporting information exchange between the electronic device 1401 and an external electronic device. The information exchange application may include, for example, a notification relay application for relaying specific information to the external electronic device or a device management application for managing the external electronic device. For example, the notification relay application may have a function for relaying, to an external electronic device, notification information corresponding to a designated event (e.g., mail reception) generated in another application (e.g., the e-mail application 1569) of the electronic device 1401. Furthermore, the notification relay application may receive notification information from the external electronic device and may provide the received notification information to the user of the electronic device 1401.

The device management application, for example, may control a power (e.g., turn-on or turn-off) or a function (e.g., brightness, resolution, or focus) of an external electronic device communicating with the electronic device 1401 or a partial element (e.g., display module or camera module) of the external electronic device. Additionally or alternatively, the device management application may install, delete, or update an application running on an external electronic device.

As described above, an electronic device (e.g., the electronic device 100 of FIG. 1) may include a housing (e.g., the housing 110 of FIG. 1) including a first housing (e.g., the first housing 111 of FIG. 1) and a second housing (e.g., the second housing 112 of FIG. 1) movable with respect to the first housing, a flexible display (e.g., the flexible display 120 of FIG. 1) in which a display area for displaying a screen is expanded or reduced as the second housing moves with respect to the first housing, a memory (e.g., the memory 520 of FIG. 5), and at least one processor configured to be electrically connected, directly or indirectly, to the flexible display and the memory, wherein the at least one processor (e.g., the processor 510 of FIG. 5) may be configured to identify a change in the size of the display area based on the movement of the second housing relative to the first housing, determine an application to be preloaded from among a plurality of applications based on the identified size of the display area, load, into the memory, a preload process including some of resources for executing the determined application to be preloaded; and, in response to the occurrence of an event associated with the execution of the application to be preloaded, load an activity for the execution of the application by using the loaded preload process.

According to an embodiment, the at least one processor may be configured to determine the preload process among the resources based on a remaining capacity of the memory.

According to an embodiment, the at least one processor may be configured to store the application to be preloaded in the memory in association with the size level of the display area.

According to an embodiment, the at least one processor may be configured to update an application related to the size level of the display area through machine learning.

According to an embodiment, the at least one processor may be configured to divide the preload process including some of the resources into at least one operation and load the divided result into the memory.

According to an embodiment, the at least one processor may be configured to determine an order in which the preload process is loaded into the memory compared to other preload processes, based on the size of the display area or an execution history of the determined application to be preloaded.

According to an embodiment, the at least one processor may be configured to load, into the memory, the preload process divided into the at least one operation for each operation at an interval of a reference time.

According to an embodiment, the at least one processor may be configured to determine the size level corresponding to the changed size of the display area among designated size levels, and determine the application to be preloaded based on the determined size level.

According to an embodiment, the designated size levels may include a horizontal and vertical ratio of the size of the display area.

According to an embodiment, the event associated with the execution of the application to be preloaded may include at least one of an event in which the at least one processor receives an input associated with the execution of the application to be preloaded from a user of the electronic device, an event of detecting that the size level of the display area is changed to the designated size level, or an event of receiving a notification from the application to be preloaded.

According to an embodiment, the at least one processor may be configured to unload an oldest preload process from among the preload processes loaded into the memory from the memory in response to the remaining capacity of the memory being less than or equal to a reference value.

According to an embodiment, the at least one processor may be configured to determine a preload process corresponding to an application to be unloaded from among the preload processes loaded into the memory to be an unload process, based on the changed size of the display area, and unload the determined unload process from the memory.

According to an embodiment, in the at least one processor, the application to be unloaded may include an application that is not executed in the changed size of the display area.

As described above, a method for operating an electronic device (e.g., the electronic device 100 of FIG. 1) including a flexible display (e.g., the flexible display 120 of FIG. 1) in which a display area for displaying a screen of the electronic device is expanded or reduced through a portion of a housing (e.g., the housing 110 of FIG. 1), and a memory (e.g., the memory 520 of FIG. 5), may include changing a size of the display area, determining an application to be preloaded from among a plurality of applications based on the changed size of the display area, loading, into a memory, a preload process including some of resources for executing the determined application to be preloaded, and, in response to the occurrence of an event associated with the execution of the application to be preloaded, generating a screen of the application for executing the application by using the loaded preload process. "Based on" as used herein covers based at least on.

According to an embodiment, the method may further include storing the plurality of applications in the memory in association with the size level of the display area, and updating an application associated with the size level of the display area in the memory through machine learning.

According to an embodiment, the loading into the memory may include dividing the preload process including some of the resources into at least one operation and loading the divided result into the memory.

According to an embodiment, the determining of the application to be preloaded may include determining a size level corresponding to the changed size of the display area among designated size levels, and determining the application to be preloaded based on the determined size level.

According to an embodiment, the designated size levels may include a horizontal and vertical ratio of the size of the display area.

According to an embodiment, the method may further include determining a preload process corresponding to an application to be unloaded from among the preload processes loaded into the memory to be an unload process, based on the changed size of the display area, and unloading the determined unload process from the memory.

According to an embodiment, the application to be unloaded may include an application that is not executed in the changed size of the display area.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

The invention claimed is:

1. An electronic device comprising:
a housing comprising a first housing and a second housing movable with respect to the first housing;
a flexible display configured so that a display area for displaying a screen is expanded or reduced as the second housing moves with respect to the first housing;
a memory; and
at least one processor, comprising processing circuitry, configured to be electrically connected to the flexible display and the memory and to:
while a basic preload process and a first preload process are loaded into the memory, identify that a size of the display area changes from a first size to a second size based on movement of the second housing relative to the first housing;
determine a first application that is not executed in the second size as an application to be unloaded and determine a second application that is executed in the second size as an application to be preloaded, from among a plurality of applications, based on that the size of the display area changes from the first size to the second size;
unload the first preload process corresponding to the first application;
load, into the memory, a second preload process comprising at least some of resources for executing the second application; and
in response to occurrence of an event associated with an execution of the second application, load an activity for the execution of the second application by using the loaded second preload process,
wherein the basic preload process is a process that is executed regardless of the size of the display area.

2. The electronic device of claim 1, wherein the at least one processor is further configured to determine the second preload process among the resources based on a remaining capacity of the memory.

3. The electronic device of claim 1, wherein the at least one processor is further configured to store the application to be preloaded in the memory in association with a size level of the display area.

4. The electronic device of claim 3, wherein the at least one processor is further configured to update an application related to the size level of the display area via machine learning.

5. The electronic device of claim 1, wherein the at least one processor is further configured to divide the second preload process comprising the at least some of the resources into at least one operation and load the divided result into the memory.

6. The electronic device of claim 5, wherein the at least one processor is further configured to determine an order in which the second preload process is loaded into the memory compared to other preload processes, based on the size of the display area or an execution history of the second application.

7. The electronic device of claim 5, wherein the at least one processor is further configured to:
load, into the memory, the preload process divided into the at least one operation for each operation at an interval of a reference time.

8. The electronic device of claim 1, wherein the at least one processor is further configured to:
determine a size level corresponding to the changed second size of the display area among designated size levels; and
determine the second application as the application to be preloaded based on the determined size level.

9. The electronic device of claim 8, wherein the designated size levels comprise a horizontal and vertical ratio of the size of the display area.

10. The electronic device of claim 1, wherein the event associated with the execution of the second application comprises at least one of: an event in which the at least one processor receives an input associated with the execution of the second application from a user of the electronic device, an event of detecting that a size level of the display area is changed to a designated size level, or an event of receiving a notification from the second application.

11. The electronic device of claim 1, wherein the at least one processor is further configured to unload an oldest preload process, from among preload processes loaded into the memory, from the memory based on a remaining capacity of the memory being less than or equal to a reference value.

12. A method for operating an electronic device comprising a flexible display, the flexible display comprising a display area for displaying a screen of the electronic device to be expanded or reduced through a portion of a housing, the method comprising:
while a basic preload process and a first preload process are loaded into a memory, changing a size of the display area from a first size to a second size;
determining a first application that is not executed in the second size as an application to be unloaded and determine a second application that is executed in the second size as an application to be preloaded, from among a plurality of applications, based on that the size of the display area changes from the first size to the second size;
unloading, from the memory, the first preload process corresponding to the first application;
loading, into the memory, a second preload process comprising at least some of resources for executing the second application; and
in response to occurrence of an event associated with an execution of the second application, generating a screen of the second application for executing the second application by using at least the loaded second preload process,
wherein the basic preload process is a process that is executed regardless of the size of the display area.

13. The method of claim 12, further comprising:
storing the plurality of applications in the memory in association with a size level of the display area; and
updating an application associated with the size level of the display area through machine learning.

14. The method of claim 12, wherein the loading into the memory comprises dividing the second preload process comprising the at least some of the resources into at least one operation and loading the divided result into the memory.

15. The method of claim 12, wherein the determining of the second application as the application to be preloaded comprises:
determining a size level corresponding to the changed second size of the display area among designated size levels; and
determining the second application as the application to be preloaded based on the determined size level.

16. The method of claim 15, wherein the designated size levels comprise a horizontal and vertical ratio of the size of the display area.

* * * * *